(12) United States Patent
Jonsson

(10) Patent No.: US 9,539,740 B2
(45) Date of Patent: Jan. 10, 2017

(54) WALL OR FLOOR CHAINSAW

(71) Applicant: HUSQVARNA AB, Huskvarna (SE)

(72) Inventor: Andreas Jonsson, Asbro (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/624,446

(22) Filed: Feb. 17, 2015

(65) Prior Publication Data

US 2015/0158202 A1 Jun. 11, 2015

Related U.S. Application Data

(63) Continuation of application No. 13/983,548, filed as application No. PCT/SE2012/050104 on Feb. 3, 2012, now Pat. No. 8,955,505, which is a continuation-in-part of application No. PCT/SE2011/000020, filed on Feb. 3, 2011.

(51) Int. Cl.
| | |
|---|---|
| *B28D 1/08* | (2006.01) |
| *B23D 59/00* | (2006.01) |
| *B27B 17/10* | (2006.01) |
| *B27B 17/14* | (2006.01) |

(Continued)

(52) U.S. Cl.
CPC .............. *B28D 1/088* (2013.01); *B23D 59/008* (2013.01); *B27B 17/10* (2013.01); *B27B 17/14* (2013.01); *B27G 19/003* (2013.01); *B28D 1/084* (2013.01); *F16D 7/025* (2013.01); *Y10T 83/7035* (2015.04); *Y10T 83/909* (2015.04)

(58) Field of Classification Search
CPC ....... B28D 1/088; B28D 1/084; B23D 59/008; B27B 17/14; B27G 19/003; F16D 7/025; Y10T 83/909; Y10T 83/7035

USPC .. 125/21; 76/25.1; 83/788, 816; 30/381–387
See application file for complete search history.

(56) References Cited

U.S. PATENT DOCUMENTS 1,342,213 A * 6/1920 Hanson ............... B27B 17/0083
144/123
1,467,150 A 9/1923 Frere
(Continued)

FOREIGN PATENT DOCUMENTS

| | | |
|---|---|---|
| CN | 1803357 A | 7/2006 |
| CN | 101960696 A | 1/2011 |

(Continued)

OTHER PUBLICATIONS

International Search Report and written opinion for International patent application No. PCT/SE2012/050104, mailed Jun. 7, 2012.

(Continued)

*Primary Examiner* — George Nguyen
(74) *Attorney, Agent, or Firm* — Nelson Mullins Riley & Scarborough LLP

(57) ABSTRACT

A chain bar unit for a wall saw is presented herein. The chain bar unit can include a bar configured to receive a circulating chain or wire around a perimeter of the bar. The chain bar unit also can include a driving gear for driving the chain or wire around the bar, the driving gear configured to be coupled to an output shaft of the wall saw. The chain bar unit further includes the bar being tapered from an end proximate to the driving gear to a distal end having a distal end radius, wherein a width of the bar at the proximate end, is at least two times the distal end radius of the distal end.

18 Claims, 27 Drawing Sheets

(51) Int. Cl.
*B27G 19/00* (2006.01)
*F16D 7/02* (2006.01)

(56) References Cited

U.S. PATENT DOCUMENTS

| | | | | |
|---|---|---|---|---|
| 1,891,105 A * | 12/1932 | Meyer | ................... | B27B 17/02 |
| | | | | 30/384 |
| 2,158,629 A * | 5/1939 | Lansing | ................. | B28D 1/082 |
| | | | | 125/21 |
| 2,638,944 A | 5/1953 | Woleslagle | | |
| 2,675,835 A | 4/1954 | Kiekhefer | | |
| RE24,588 E * | 1/1959 | Budd | ................. | B27B 17/06 |
| | | | | 30/371 |
| 3,059,673 A * | 10/1962 | Woleslagle | .......... | B27G 19/003 |
| | | | | 30/161 |
| 3,182,695 A * | 5/1965 | Rigoni | ................. | B27G 19/003 |
| | | | | 30/382 |
| 3,247,873 A * | 4/1966 | Aitken | ................... | B27B 17/14 |
| | | | | 30/386 |
| 3,331,407 A * | 7/1967 | Merz | ................. | B27B 17/02 |
| | | | | 30/387 |
| 3,545,422 A * | 12/1970 | McNulty | ................ | B28D 1/084 |
| | | | | 125/21 |
| 3,849,884 A | 11/1974 | Arff | | |
| 3,931,676 A * | 1/1976 | Merle | ................. | A01G 23/091 |
| | | | | 30/371 |
| 4,181,115 A * | 1/1980 | Weisner | ............... | B23D 59/001 |
| | | | | 125/21 |
| 4,603,678 A * | 8/1986 | Fish | ................. | B28D 1/084 |
| | | | | 125/21 |
| 4,744,148 A * | 5/1988 | Brown | ................. | A01D 34/833 |
| | | | | 30/276 |
| 4,884,340 A * | 12/1989 | Newman | ................ | A01D 34/90 |
| | | | | 30/122 |
| 4,981,129 A * | 1/1991 | Osterman | ................ | B27B 17/02 |
| | | | | 125/21 |
| 4,986,252 A | 1/1991 | Holmes et al. | | |
| 5,103,881 A | 4/1992 | Johnson | | |
| 5,145,044 A | 9/1992 | Kramer et al. | | |
| 5,193,519 A * | 3/1993 | Elliot | ................ | B28D 1/045 |
| | | | | 125/14 |
| 5,806,401 A | 9/1998 | Rajala et al. | | |
| 6,286,905 B1 | 9/2001 | Kimura et al. | | |
| 6,955,167 B2 * | 10/2005 | Baratta | ................ | B23D 45/046 |
| | | | | 125/13.01 |
| 7,018,279 B2 | 3/2006 | Baratta | | |
| 7,287,330 B1 | 10/2007 | Riha | | |
| 7,481,000 B2 | 1/2009 | Tynes et al. | | |
| 7,757,684 B2 * | 7/2010 | Baratta | ................. | B23D 47/00 |
| | | | | 125/21 |
| 2006/0201492 A1 * | 9/2006 | Baratta | ................. | B23D 47/02 |
| | | | | 125/21 |
| 2006/0230893 A1 * | 10/2006 | Brooks | ................. | A01G 3/002 |
| | | | | 83/13 |
| 2007/0056425 A1 * | 3/2007 | Bonar | .................... | E02F 3/143 |
| | | | | 83/834 |
| 2013/0306047 A1 * | 11/2013 | Jonsson | ............... | B23D 59/008 |
| | | | | 125/21 |
| 2015/0306782 A1 * | 10/2015 | Joye | ....................... | B27B 17/08 |
| | | | | 30/123.4 |

FOREIGN PATENT DOCUMENTS

| | | |
|---|---|---|
| DE | 102004032973 A1 | 2/2006 |
| DE | 202006012143 U1 | 11/2006 |
| EP | 0333974 A1 | 9/1989 |
| EP | 1166984 A1 | 1/2002 |
| EP | 1764197 A2 | 3/2007 |
| EP | 2113328 A1 | 11/2009 |
| GB | 2354481 A | 3/2001 |
| JP | 2002210727 A | 7/2002 |
| JP | 2004188989 A | 7/2004 |
| RU | 2167051 C1 | 5/2001 |
| SE | 463086 B | 10/1990 |
| WO | 2009108093 A1 | 9/2009 |
| WO | 2009108094 A1 | 9/2009 |
| WO | 2011014395 A2 | 2/2011 |
| WO | 2012105876 A1 | 8/2012 |
| WO | 2012105904 A1 | 8/2012 |

OTHER PUBLICATIONS

International Preliminary Report on Patentability for International patent application No. PCT/SE2012/050104, issued Apr. 23, 2013.
International Search Report and written opinion for International patent application No. PCT/SE2011/000020, mailed Dec. 6, 2011.
International Preliminary Report on Patentability for International patent application No. PCT/SE2011/000020, issued Aug. 6, 2013.

* cited by examiner

WALL OR FLOOR CHAINSAW

CROSS-REFERENCE TO RELATED APPLICATIONS

The present application is a continuation of U.S. application Ser. No. 13/983,548 filed Aug. 2, 2013, now U.S. Pat. No. 8,955,505, which is a national stage entry of PCT/SE2012/050104 filed Feb. 3, 2012, which is a continuation-in-part of PCT/SE2011/000020, which was filed on Feb. 3, 2011, said applications are expressly incorporated herein in their entirety.

FIELD

The present disclosure relates to wall or floor saws and specifically a wall or floor saw having a chainsaw cutting element.

BACKGROUND

A wall saw or floor saw is used for cutting openings in either a wall or floor. While some saws are designed specifically to cut only a wall or a floor, other are designed to cut both a wall and a floor. A wall or floor saw typically uses a circular cutting blade to cut the opening. The blades of the wall or floor saw are typically large and require a safety cover to prevent debris from being spread around the area in which the saw is being used.

BRIEF DESCRIPTION OF THE DRAWINGS

Implementations of the present application will now be described, by way of example only, with reference to the attached Figures, wherein.

DETAILED DESCRIPTION

Figure 1:
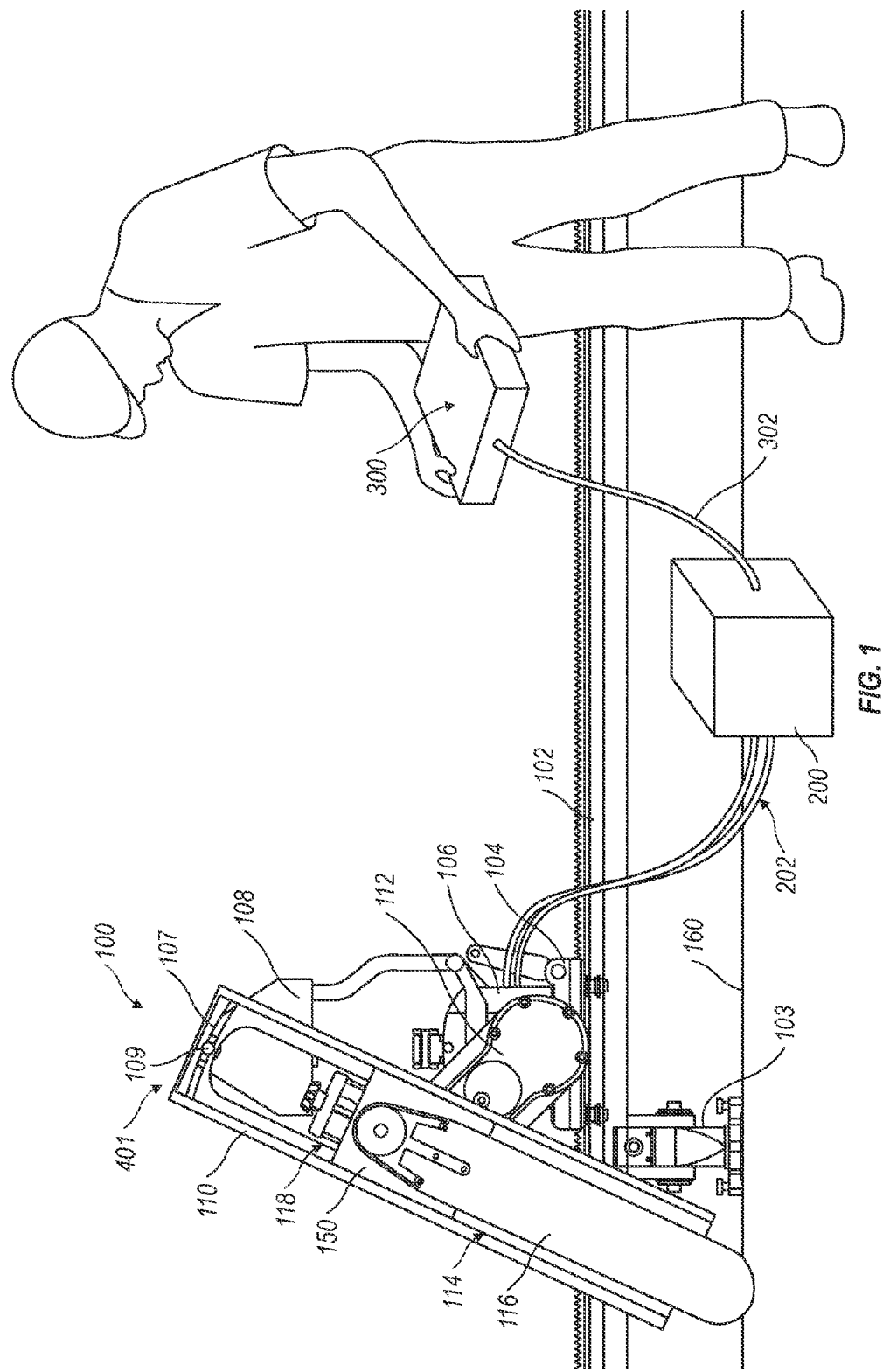
FIG. 1 illustrates a saw for cutting a wall or floor according to an exemplarily embodiment of the present disclosure.

The present disclosure relates to wall saws or floor saws. The term wall saw and floor saw are often used interchangeably as the types of saws can often be used for either application. A wall saw is a saw that is designed to cut an opening in a wall of a structure typically a concrete structure. A wall saw can use a circular cutting blade, a chain saw or a wire saw. A floor saw is typically the same saw but configured to cut the floor of a structure. These saws are typically secured to the wall or floor via mounting brackets and move along a track. The present disclosure applies equally to floor or wall saws (hereinafter referred generically as a "saw"). The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The present disclosure presents improvements to a chain saw for use with a wall or floor saw. In at least one embodiment, the chain saw can be removably coupled to the saw. A safety cover attachment mechanism for affixing a safety cover around the chain bar of the chain saw is presented. The safety cover as described herein can also function as a guide for the chain bar of chain saw. Additionally, a chain tensioning mechanism is disclosed for adjusting the tension of the chain or cutting element traversing the perimeter of the chain bar is disclosed. A clutch mechanism for allowing a drive gear to slip when torque is exceeded is also disclosed. Additionally, a positioning system is disclosed for controlling the saw during a cut is disclosed.

In at least one embodiment, an interchangeable chainsaw cutting assembly is disclosed that can be adapted for rotatable installation upon a pivotable arm of a wall saw in exchange for a circular saw blade. The interchangeable chainsaw cutting assembly can include one or more components as presented herein. For example, the interchangeable chainsaw cutting assemble can include a safety cover and a chain bar unit. In another example, the interchangeable chainsaw cutting assembly can include a safety cover and a chainsaw assembly housing. In yet other examples, the interchangeable chainsaw cutting assembly can include just the chain bar unit or the chains saw assembly housing. Furthermore, the chain tensioning mechanism as disclosed can be optionally included with the interchangeable chainsaw cutting assembly. Furthermore, a clutch mechanism can be included with the interchangeable chainsaw cutting assembly. Details of some exemplarily implementations of the above improvements are given below. The implementations as presented herein can have elements which are optionally included.

A saw according the present disclosure can implement one or more of these improvements. In at least one embodiment, the saw can include all of the improvements. Additionally, these improvements can be implemented on other types of saws or machines as well.

FIG. 1 illustrates an exemplarily saw 100 according to the present disclosure. The saw 100 is coupled to a power driver 200 which in turn is coupled to a controller 300. In the illustrated example, the coupling of the power driver 200 to the saw 100 is via wires 202. The wires 202 can be arranged to provide power to one or more motors on the saw 100. The wires 202 can also carry data from the saw to the power driver 200 and/or the controller 300. While only two wires 202 are illustrated, it is appreciated that multiple wires can be inside each one of the wires 202. Furthermore, additional wires can be included to provide the power and data to and from the saw. The controller 300 is coupled to the power driver 200 via a wire 302. The wire 302 can provide data to the controller 300, which can in turn be used to instruct the power driver 200 to transmit power and data to the saw 100. While the connection between the power driver 200 and controller 300 is illustrated to be a single wire 302, multiple wires can be included within the wire 302 or multiples wires can be implemented instead of the wire 302. In yet other embodiments, the controller 300 can be wirelessly coupled to the power driver 200. The coupling of the controller 300 to the power unit 200 allows the operator to be away from the saw 100. When provided with a wireless controller, the operator can be in a location where wires do not permit access.

While the coupling of the saw to the power driver has been described above in relation to wires, in other embodiments, the coupling of the saw to the power driver can be through hydraulic connections. Additionally, in at least one embodiment, an electrical feedback connection can be implemented in addition to the hydraulic connection to provide positioning information to the power driver and/or controller.

In addition to the illustrated wires 202, the saw can be provided with a water supply connection. The water supply can either be directly connected to the saw or be connected through the power driver 200.

The saw 100 is mounted on a rack 102 via a carriage 104. The rack 102 as illustrated includes one or more rails and a gear engagement mechanism, and can be mounted to a wall or floor. The gear engagement mechanism couples to a motor configured to drive the carriage 104 and saw 100 along the rack 102. In other embodiments, other engagement configurations can be included. The rack 102 is coupled to the floor via a floor mount 103. The floor mount 103 can be a specialized floor mounting system or can be used interchangeably when the saw 100 is used for cutting a wall. In the illustrated example, the floor mount 103 couples to the lower portion of the rack 102. The floor mount 103 also includes releasable fasteners for coupling the floor mount 103 to the floor. In at least one embodiment, the floor mount 103 can be used as a wall mount. In other embodiments, a different wall mount can be implemented.

The saw 100 includes a saw motor 106 that drives the cutting element (a chain in the present embodiment, not shown). In at least one embodiment, the saw motor 106 can be the only motor for the saw 100 and is capable of transferring power to either the cutting element, a saw arm 112 and the carriage 104. In other embodiments, multiple motors can be implemented, for example individual motors can be provided for powering the saw arm 112 and carriage 104.

Figure 20:
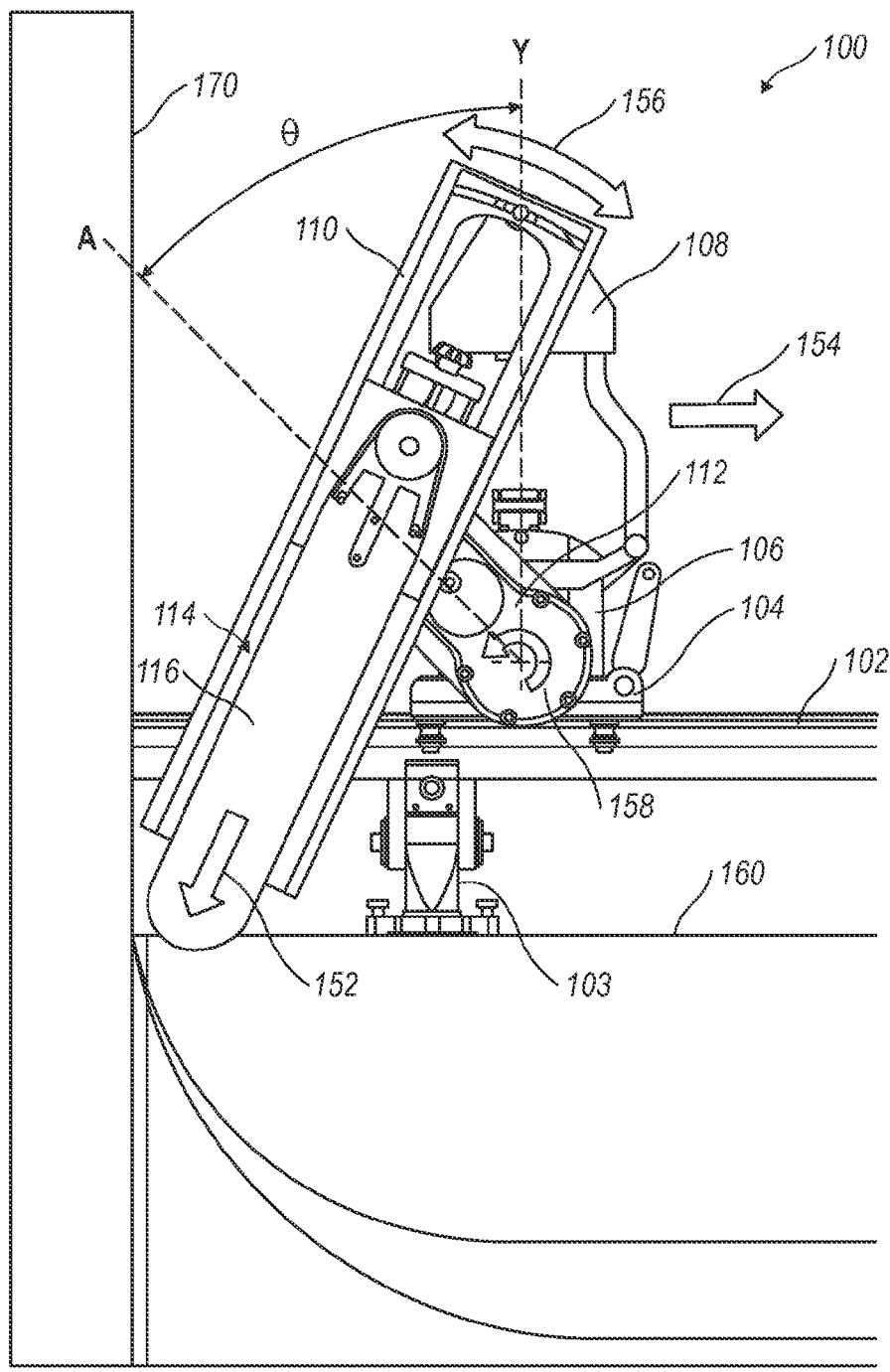
FIG. 20 is an elevation view of saw in a second orientation according to an exemplarily embodiment of the present disclosure.
Figure 22:
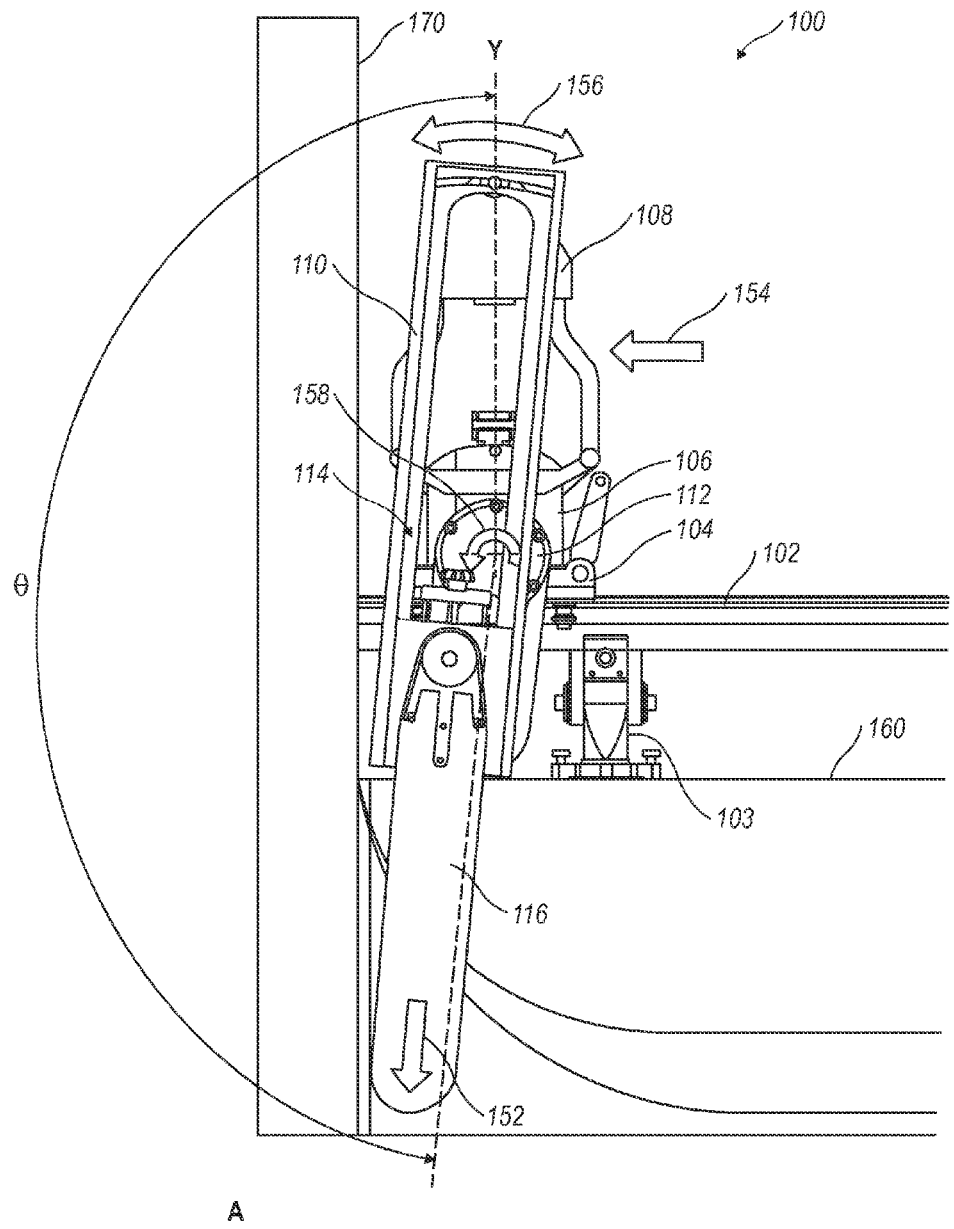
FIG. 22 is an elevation view of saw in a fifth orientation according to an exemplarily embodiment of the present disclosure.

The saw 100 also includes a safety cover anchor mechanism 108 which is coupled to the carriage 104. The safety cover anchor mechanism 108 allows a safety cover 110 to be attached to the saw via a retention member 401. The retention member 401 allows the safety cover 110 to rotate or turn with respect to the safety cover anchor mechanism 108. In the illustrated example, the saw motor 106 is coupled to a saw arm 112, which in turn is coupled to the chain bar 116. The chain bar is adjustably mounted to a chain saw assembly housing 150, which is slidably connected to the safety cover 110 via guides 114. Therefore the safety cover 110 and the connected chain saw assembly housing 150 together form a chain bar guiding system for the chain saw, providing numerous advantages compared to previous chain bar guiding systems. If for instance the saw arm 112 is turned slightly anti clockwise from the position shown in FIG. 1 the safety cover 110 will turn slightly clockwise around the affixment mechanism 109 and the housing 150 with saw bar 116 will slide slightly downwards within the safety cover 110. The retention member 401 is located at or near an outer end of the safety cover, i.e. away from the cut, while the guides 114 are arranged to be able to guide the housing 150 essentially all the way to an inner or cutting end of the safety cover 110. This design enables the saw bar 116 to be essentially fully withdrawn into the safety cover and be in a vertical position, as shown in FIG. 20, or the saw bar to be in a far out position as shown in FIG. 22. The safety cover 110 is of course always perfectly in line with the saw bar, enabling the width of the cover to be only somewhat wider than the saw bar itself. Without this design a much wider, heavier and more costly safety cover would have been needed, very similar to a conventional wall saw safety cover. Further this design makes the housing 150 to automatically be turned more than 90 degrees in relation to the outer end of the saw arm 112 during the cut, compare FIG. 1 and FIG. 22.

Figure 18:
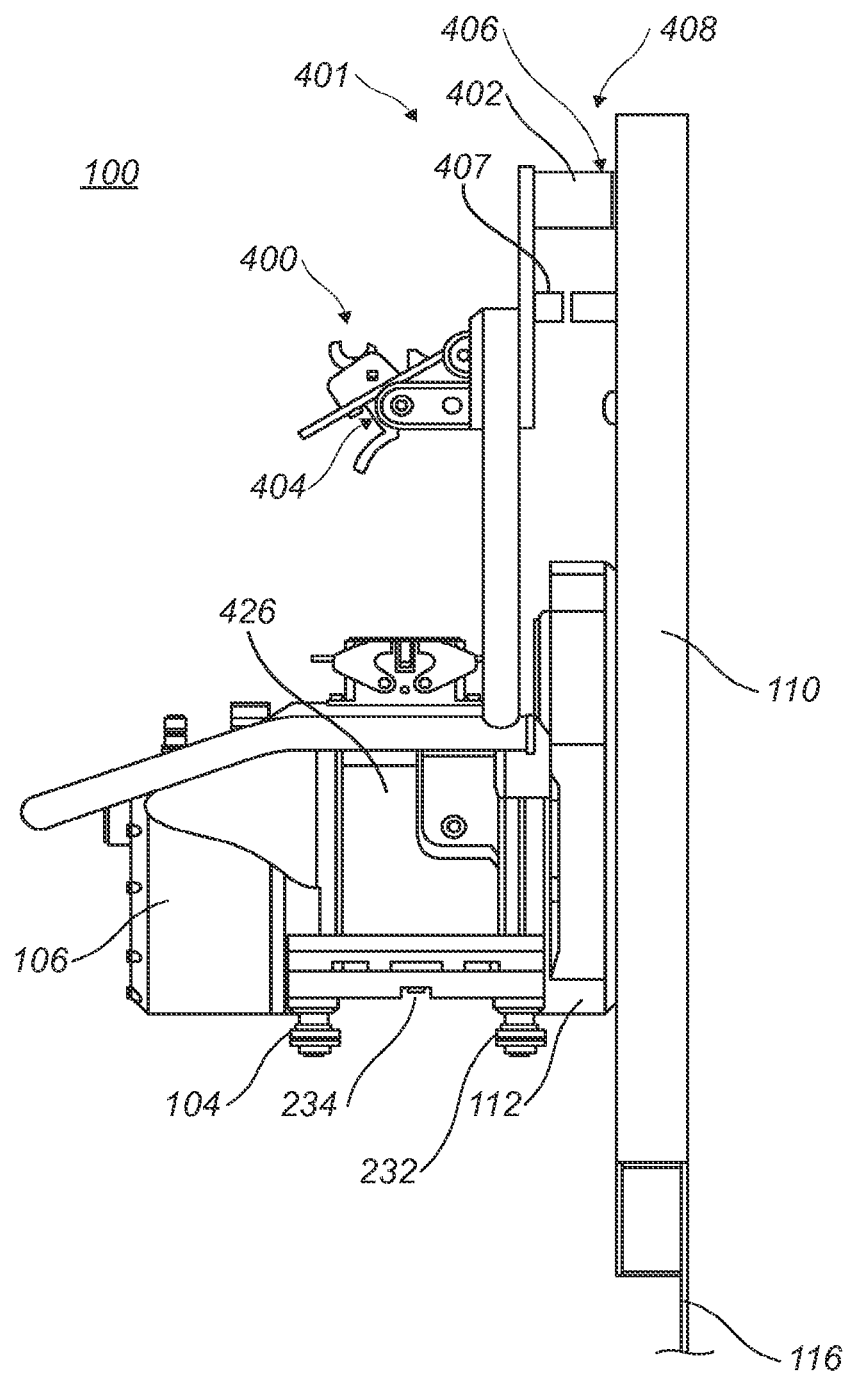
FIG. 18 is side view of the saw according to present disclosure.

Additionally, the retention member 401 having an aligned set of contact surfaces configured to releasably fix the safety cover 110 to the incorporating concrete cutting wall chainsaw 100 in an operating orientation. The retention member 401 having a misaligned set of contact surfaces configured to restrain the safety cover in a misaligned orientation. The connection 109 can slide within contact surfaces 107 when the safety cover 110 is in a misaligned orientation. Furthermore, the chain bar guiding system can include a decoupling detector 407 (see FIG. 18) that detects when the safety cover 110 is in the misaligned orientation. The decoupling detector 407 transmits data to stop the rotation of a saw motor 106 when the misaligned orientation is detected. The signal from the decoupling detector 407 can be transmitted to the controller 300 or it can be transmitted directly to the saw motor 106 itself to prevent any further rotation until a clear condition is detected either by the decoupling detector 407 or the controller 300 issues an override signal. FIG. 18 as described below presents a side view of the retention member 401.

Figure 2:
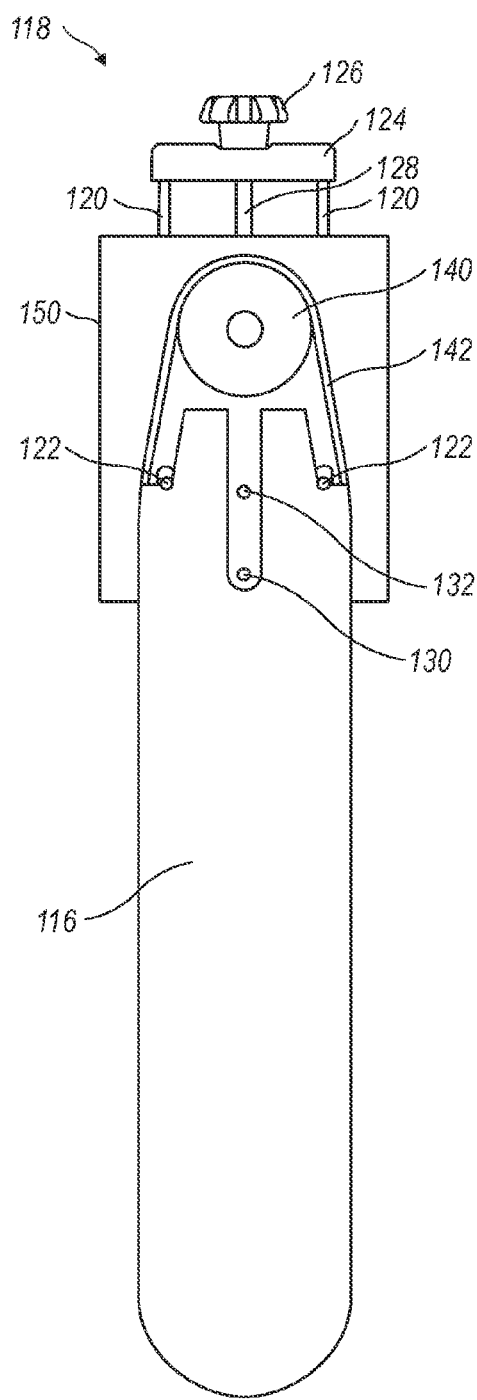
FIG. 2 illustrates a front elevation view of chain bar and associated tensioning member according to an exemplarily embodiment of the present disclosure.
Figure 3:
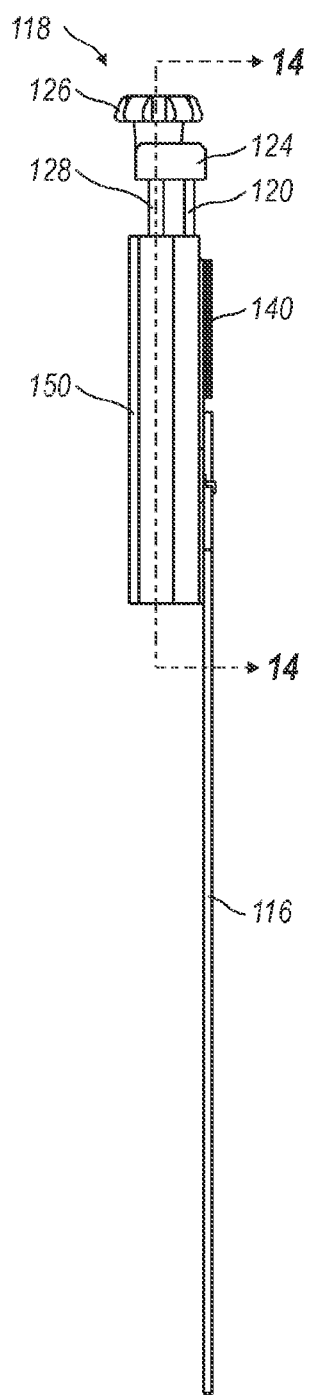
FIG. 3 illustrates a side elevation view of chain bar and associated tensioning member of FIG. 2.
Figure 4:
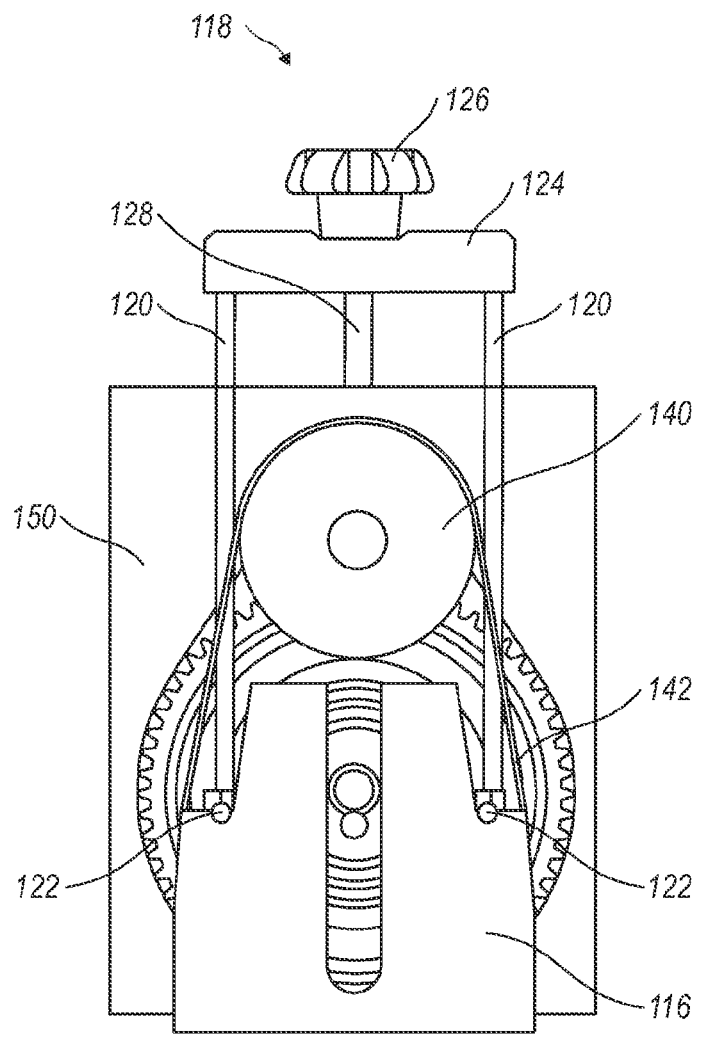
FIG. 4 is a detail view of the chain bar and associated tensioning member to an exemplarily embodiment of the present disclosure.

The chain bar 116 and associated components are illustrated in more detail in FIG. 2-4. A saw chain tension adjustment mechanism 118 is illustrated. The chain tensioning mechanism includes a variably configurable expansion mechanism operable to urge the chain bar 116 away from the drive sprocket 140 thereby tensioning the chain blade 142 above the chain bar 116. The drive sprocket 140 is located a distance from one end of the chain bar 116. The expansion mechanism is interposed between the chain bar and a drive sprocket for driving a cutting chain around the chain bar. The chain tensioning mechanism 118 as illustrated includes a pair of tensioning rods 120, wherein each tensioning rod 120 is adjustable to a distance between the chain bar 116 and a drive sprocket 140. The pair of tensioning rods 120 are substantially parallel to the chain bar 116. As illustrated, a pair of tensioning rods 120 is coupled to a tension connecting member 124. Each of the pair of tensioning rods 120 are coupled at a first end to the tension connecting member 124. Each of the tensioning rods is also coupled to engagement projection 122 projecting from a second end of the tensioning rod 120 opposite the first end. In at least one embodiment, the engagement projection 122 can be integrally formed on the second end of the tension rod 120. An adjustment member 126 in the form of a knob is coupled to the tension connecting member 124 and provides for adjustment of the tensioning rods 120. The adjustment member 126 is coupled to the chain saw assembly housing 150 by a support member 128. As the adjustment member 126 is rotated the position of the tension connecting member 124 is changed relative to the housing 150. The adjustment in position of the tension connecting member 124 controls the location of the tension rods 120 within the chain saw assembly housing 150, which in turn controls the location of the chain bar 116 relative to chain sprocket 140. As the chain bar 116 is separated from the chain sprocket 140, the resulting tension in a saw chain 142 is increased. Likewise, the chain bar 116 can be adjusted so that it is closer to the chain sprocket 140 thereby reducing the tension in the saw chain 142. The chain tensioning mechanism 118 can also at least one releasable fastener (130, 132). The at least one releasable fastener (130, 132) affixes the chain bar 116 to the chain saw assembly housing 150.

The chain saw assembly housing 150 can be configured to be releasably mounted to the saw arm 112. The saw arm can contain gearing or other mechanism to allow for coupling of both a chainsaw member or a circular cutting saw member on an outer end of the saw arm 112. The chain saw assembly housing 150 of the chainsaw cutting assembly can be as shown in relation to FIGS. 1-4 or be alternatively arranged as described below. The arrangements can be used interchangeably as contemplated by this disclosure.

A chainsaw cutting assembly 500 is described that can be removably engaged with a saw arm 112. The gear train 525 that has been described serves as an example of a ratio transmission 525 composed of a number of different sized round members. As described below, the gear train or ratio transmission 525 of the present disclosure can be configured in several different ways.

In FIGS. 5-13, several different configurations of interchangeable concrete chainsaw cutting assemblies or heads 500 are shown. Universally, the disclosed chainsaw cutting assemblies 500 are adapted for installation upon a saw arm 112. The chainsaw cutting assembly 500 is configured and intended to be exchanged for a removed, and different type cutting head assembly. As an example, the different type cutting head assembly can be a rotary saw blade taking the form of the blade cutting head assembly.

Figure 5:
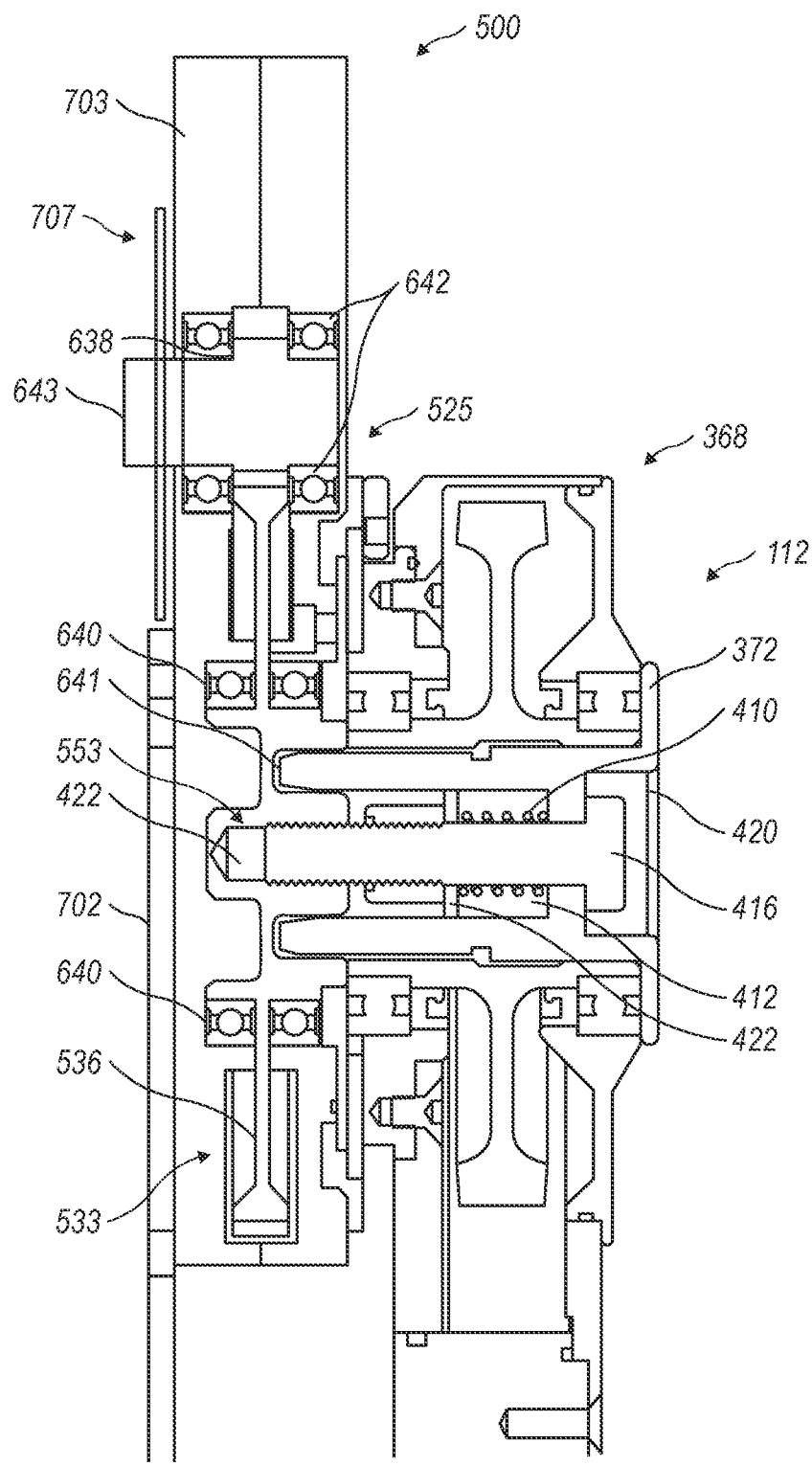
FIG. 5 is a sagittal section of an exemplary chainsaw cutting assembly and drive assembly.

The chainsaw cutting assembly 500 includes a chain saw assembly housing 703 having fasteners (only partly shown) for releasably attaching the housing 703 to the outer end of a saw arm 112 in an installed configuration. For example, FIG. 5 shows a chainsaw cutting assembly 500 adapted to be releasably attached to a saw arm 112. Suitable saw arms 112 deliver a motive force from the outer end of the saw arm 112, preferably from the saw motor 106. By example, the drive motor can be an electric motor or an hydraulic motor. When the motor is an electric motor, the drive direction can easily be adjusted via switches. In the case where the motor is a hydraulic motor, the rotational direction of the drive force can be controlled using valves to appropriately direct the hydraulic fluid powering the motor. In at least some implementations, the drive motor is remotely powered, for example via a hydraulic power pack.

The gear train described earlier is one example of a ratio transmission 525 disclosed herein. Other ratio transmissions 525 are also disclosed and are described below. In all instances, the ratio transmission 525 of the present disclosure comprises a plurality of interconnected rotatable members. Exemplarily, each rotatable member has a center mounting shaft that is positioned at a distal end thereof at a fixed location on the housing by a corresponding bearing assembly. In each example, the plurality of rotatable members comprise (include) a round, disk-shaped driven member 533 and a round, disk-shaped cutting chain drive member 535. The driven member 533 can have a circumference at least twice as long as a circumference of the cutting chain drive member 535.

The driven member 533 has a receiver 553 that interconnects with a driveshaft of the saw arm in the installed configuration whereby the driven member 533 is rotated by the saw arm 112. The ratio of the transmissions described herein can range amongst and between approximates of 2 to 1, 3 to 1, 3.3 to 1, 4 to 1, 5 to 1, 6 to 1, 7 to 1, 8 to 1, 9 to 1 or more. Additionally, other ratios within those ranges are also contemplated by this disclosure. In at least one embodiment, the ratio of the transmission is at least 6 to 1. In another embodiment, the ratio of the transmission is greater than 6 to 1. In this context, the stated "ratio" refers to the number of revolutions that will be executed by the cutting chain drive member 535 in correspondence with one revolution executed by the interconnected driven member 533.

Figure 6:
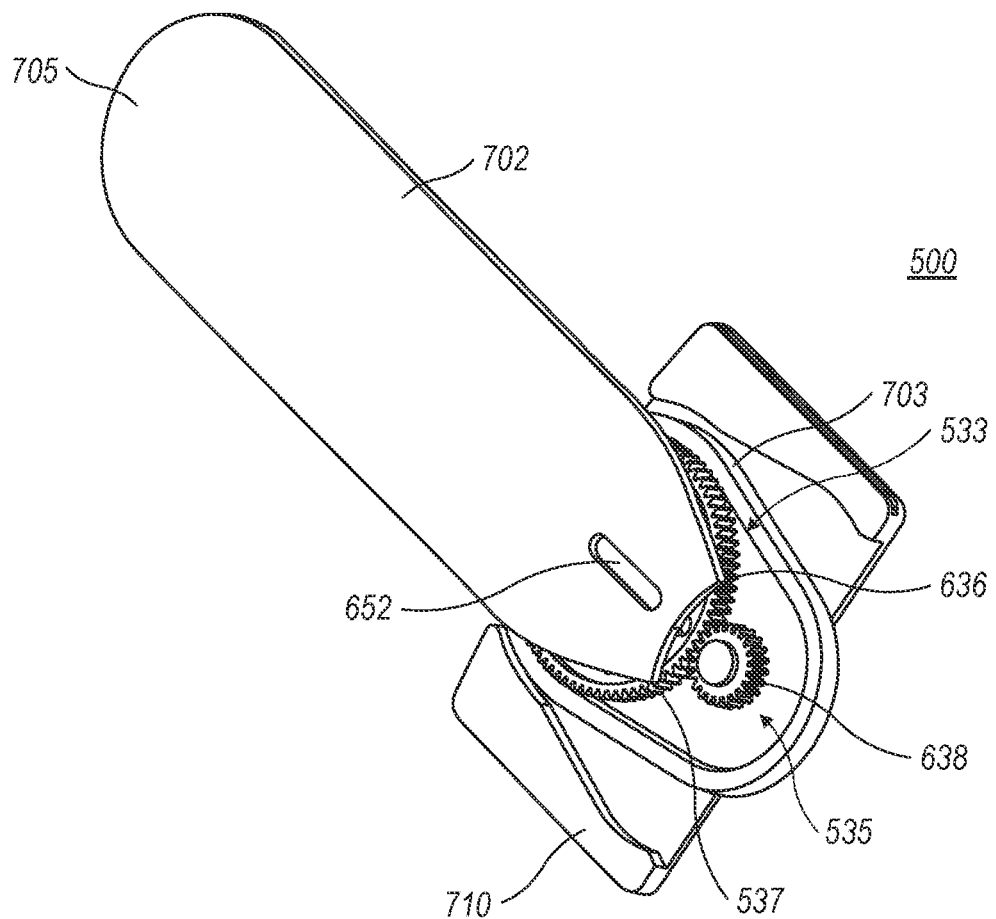
FIG. 6 is front isometric and partial cutaway view of an exemplary chainsaw cutting assembly having two directly engaged gears.
Figure 7:
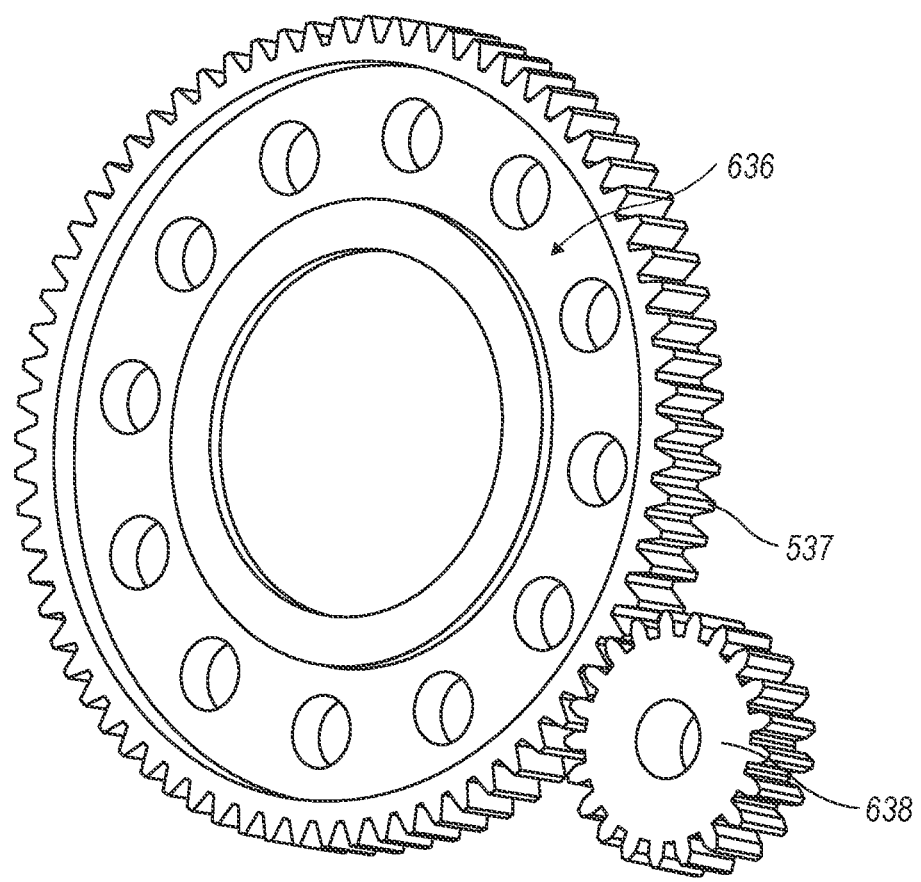
FIG. 7 is an isometric view of the two gears of FIG. 6.

Several different embodiments of ratio transmissions 525 are illustrated in FIGS. 5-13. In FIGS. 5-7, a ratio transmission 525 is shown with gear wheels constituting the disk-shaped driven member 533 and the disk-shaped cutting chain drive member 535. As shown, each sprocket gear has a series of teeth 537 about its circumference.

An interchangeable concrete chainsaw cutting assembly 500 is depicted in FIG. 5, shown in an installed configuration upon a partially illustrated saw arm 112. As shown, the saw arm 112 includes an output portion 368 which is partially illustrated along with a chainsaw cutting assembly 500. Additionally, the output portion 368 includes a blade drive shaft 372 drivingly engaged with the chainsaw cutting assembly 500. The blade drive output shaft 372 can have a circular configuration or be in the form of another shape. For example, the blade drive output shaft 372 can have at least a portion that is hexagonally shaped for mating with a correspondingly shaped receiver on, or connected with the driven member 533. In other implementations, the blade drive output shaft 372 can take other shapes.

As depicted in FIG. 5, a releasable fastener in the form of a blade flange mounting bolt 416 is utilized. As shown, the blade drive output shaft 372 is formed so that the blade flange mounting bolt 416 is recessed within a first bore 410 of the blade drive output shaft 372. The blade flange mounting bolt 416 is threadedly coupled with the chainsaw cutting assembly 500. An optional compression spring 420 can be further included with the fasteners. The compression spring 420 is located between the bottom of the second bore 412 and a retaining ring 422 on the shaft of the bolt 416. The retaining ring 422 is fixed on the bolt axially, and is dimensioned so as to substantially center the bolt in the second bore 412 so that the bolt 416 is aligned with the threaded bore 424 in the chainsaw cutting assembly 500. The compression spring 420 biases the bolt outward of the first bore 410. When the chainsaw cutting assembly 500 is properly aligned with and oriented with respect to the blade drive shaft 372, turning the bolt 416 threads the bolt into the threaded bore 424, drawing the chainsaw cutting assembly 500 into engagement with the blade drive shaft 372 until the blade drive shaft 372 and the chainsaw cutting assembly are fully engaged as shown in FIG. 5.

The chainsaw cutting assembly 500 is depicted in FIG. 5 to include a round, disk-shaped driven member 533 in the form of a driven gear wheel 636. A chain saw assembly housing 703 is releasably fixed to the blade drive shaft 372, and can be turned around the center of the drive shaft 372. In the embodiment according to FIG. 6 the housing 703 is intended to be turned manually and be locked in the selected turning angle by a locking device attaching the housing 703 to a setting plate 710 attached to the outer end of the saw arm. This would however result in big changes of the cutting angle, i.e. the angle that the chain saw bar 116 makes with the surface to be cut. Instead the setting plate should preferably be guided by a guide in the safety cover, and not be attached to the outer end of the saw arm 112. this would keep the setting plate vertical during the whole cut, and provide a constant cutting angle during the cut. However this would result in a big and complicated safety cover. Possibly a separate drive could be arranged on the setting plate so the setting angle could be adjusted from the controller. This would be fairly complicated, but could possibly enable a simpler safety cover. For the chain saw assembly housing 150 described earlier a much more simple solution has been chosen. A chain bar guiding system automatically turns the housing 150 when the saw arm is turned as described earlier. As illustrated, the blade drive shaft 372 is inserted into the driven gear 636 and further coupled with the blade flange mounting bolt 416. In this manner the driven gear 636 receives power from the blade drive shaft 372. The driven gear 636 rotates, and in turn causes the cutting chain drive member 535 to rotate. As illustrated in FIGS. 6 and 7, the cutting chain driven member 533 is a cutting chain drive gear 638. The driven gear 636 and cutting chain drive gear 638 each have teeth 537 that are located about the respective member's circumference. The teeth 537 of the driven gear 636 and cutting chain drive gear 638 mesh and the cutting chain drive gear 638 is rotated by the driven gear 636. The cutting chain drive gear 638 is operatively interconnected with a drive sprocket 707, whereby rotation of the cutting chain drive member 535 rotates the drive sprocket 707.

The drive sprocket 707 is coupled with a cutting chain. A nose sprocket 708 (not shown) can be located at the nose 705 of the chain bar 702 and rotatably mounted to the chain bar 702. The nose sprocket 708 can allow for increased control over the tensioning of the cutting chain, reduced wear on the chain bar 702, and better alignment on the chain bar 702. When the chainsaw cutting assembly 500 is equipped with both a drive sprocket 707 and a nose sprocket 708, the cutting chain can be suspended on the drive sprocket 707 and nose sprocket 708 for circulation about the chain bar 702. In the embodiments without the nose sprocket 708, the drive sprocket 707 drives the chain in circulation about the chain bar 702 with the nose 705 of the chain bar 702 positioning the cutting chain as it circulates about the chain bar 702.

Additionally, driven gear bearings 640 are located about the driven gear shaft 641 and cutting chain drive gear bearings 642 are located about the cutting chain drive gear shaft 642. The placement and sizing of the driven gear bearings 640 and cutting chain drive gear bearings 642 can increase the life of the bearings. As spacing between the bearing assemblies is increased, their size can be commensurately increased to yield more robust assemblies that provide longer and more reliable operational life.

An isometric and partial cutaway view of the chainsaw cutting assembly 500 is illustrated in FIG. 6. As illustrated, the cutaway exposes the driven gear 636 and cutting chain drive gear 638. As drawn to scale at least in FIG. 7, the driven gear 636 has a circumference at least twice as long as a circumference of the cutting chain drive gear 638. The greater circumference of the driven gear 636 causes the cutting chain drive gear 638 to rotate at a higher revolution per minute as compared to the speed of that corresponding driven gear 636. This increased speed facilitates the cutting chain being rotated at a desired speed, or revolutions per minute. In some embodiments, the circumference of the driven gear 636 can be as great as five times that of the circumference of the cutting chain drive gear 638.

As illustrated in FIG. 6, the chain bar 702 is positioned so that a portion of the chain bar 702 is over the housing 703. The chain bar 702 includes a mounting slot 652 for accepting a mounting device of the housing 703. Additionally, the chain bar 702 can accept a cutting fluid such as water.

FIG. 7 illustrates the driven gear 636 engaged with the cutting chain drive gear 638. As FIG. 7 is drawn to scale, the driven gear 636 has a circumference about 3.3 times larger than that of the cutting chain drive gear 638. The gears can each be coupled to a respective support shaft using a keyway or the like. In other embodiments, the gears can be bonded or welded to the shaft.

When the chainsaw cutting assembly 500 is configured with two direct engaged gears as illustrated in FIGS. 6 and 7, the resulting direction in which the chain is driven is opposite to the rotational drive direction received from the blade drive shaft 372. In some instances, the rotational difference in direction is considered undesirable. In order to accommodate the change of direction when two gears are directly engaged with one another, a reverse direction of the drive output shaft 372 may be required. The reverse direction can be achieved using a valve mechanism when the motor is a hydraulic motor. When the motor is an electric motor, a switch and/or transformer can be implemented to reverse the output rotational direction. In some circumstances, the requirement that the drive direction be reversed is undesirable as it can increase cost and/or user confusion when operating the chainsaw cutting assembly 500.

In an alternative embodiment, and as depicted in FIGS. 8-13, a looped member, mechanism, chain, belt or band 624 is operatively engaged about portions of the circumference of the driven member 533 and the circumference of the cutting chain drive member 535 whereby the driven member 533 rotates the cutting chain drive member 535. In at least one embodiment, a variably configurable tension adjustment mechanism 626 can be engaged with the looped member 624. The tension adjustment mechanism 626 can be a round, disk-shaped wheel having a circumference abuttingly engaged upon an exterior peripheral surface of the looped member 624. The position of the tension adjustment mechanism 626 determines how much inward pressure is exerted on the looped member 624 and in turn, how much the looped member 624 is displaced and correspondingly tightened. Advantageously, the position of the tension adjustment mechanism 626 can be variably controllable, and in one example, it is biased inwardly on the looped member 624 thereby acting as a take-up mechanism for slack that may occur.

In these spaced-apart configurations, the driven member 533 is separated by space, for example clear space 630, apart from the cutting chain drive member 535. The distance by which the driven member 533 and the cutting chain drive member 535 are separated can be less than the diameter of either the driven member 533 or the cutting chain drive member 535. In another example, the amount of clear space 630 separating the driven member 533 from the cutting chain drive member 535 measures less than the radius of either the driven member 533 or the cutting chain drive member 535. In this manner, suitable clearance spacing is provided between the members 533 and 535, but the compact package of the gear train is still maintained.

A goal is to set transmission member separation as described so that the spacing 630 between the driven member 533 and the cutting chain drive member 535 accommodates sufficiently robust bearing assemblies for the members' mounting shafts to facilitate more than an hour of operation from a particular interchangeable concrete chainsaw cutting assembly or head 500. In an exemplary embodiment, the gear train 525 can endure at least two hours of operation due to the robust bearing assemblies having circumferences greater than the gear/pulley members 533, 535 mounted thereto; in at least one embodiment, the endurance tests to over two hours of use.

When the driven member 533 and cutting chain drive member 535 are sprocket gears 539, such as shown in FIG. 7, each has a series of teeth 537 about the respective member's circumference and the looped mechanism 624 is a roller chain (not illustrated). When the roller chain is utilized, the driven member 533, in the form of a gear, is separated by clear space 630 apart from the cutting chain drive member 535, also in the form of a gear. As described above, the clear space 630 between the driven gear 636 and cutting chain drive member 535 is a distance less than the diameter of either the driven gear 636 or the cutting chain drive gear 638. In another implementation, the distance of separation by clear space 630 is less than the radius of either the driven gear 636 or the cutting chain drive gear 638. In other implementations, the distance of separation can be as described above regarding suitable separation for accommodating the bearings for the drive gear bearings 640 and chain cutting drive gear bearings 642. The distance of separation is such that the driven gear 636 and cutting chain drive gear 638 are radially spaced apart. The radially spacing can be distances similar to that described above.

As presented with respect to FIGS. 8-13, the present disclosure further includes other looped mechanisms 624 operatively engaged about portions of the circumference of the driven member 533 and circumference of the cutting chain drive member 535, whereby the driven member 533 rotates the cutting chain drive member 535. The specific embodiments presented in these figures can be configured as described above, as well. The looped mechanisms 624 as presented herein can be longer or shorter than illustrated. As the length of the looped mechanism 624 is increased the life of the looped mechanism 624 can be increased as the wear on individual parts of the looped mechanism 624 is decreased. Additionally, a tension adjustment mechanism 626 is illustrated herein. In at least one embodiment, the tension adjustment mechanism 626 can be omitted. When the tension adjustment mechanism 626 is omitted the looped mechanism 624 can have an increased life. The implementation of the tension adjustment mechanism 626, however, allows for greater control over the slippage of the looped mechanism as it engages with at least the cutting chain drive member 535.

Figure 8:
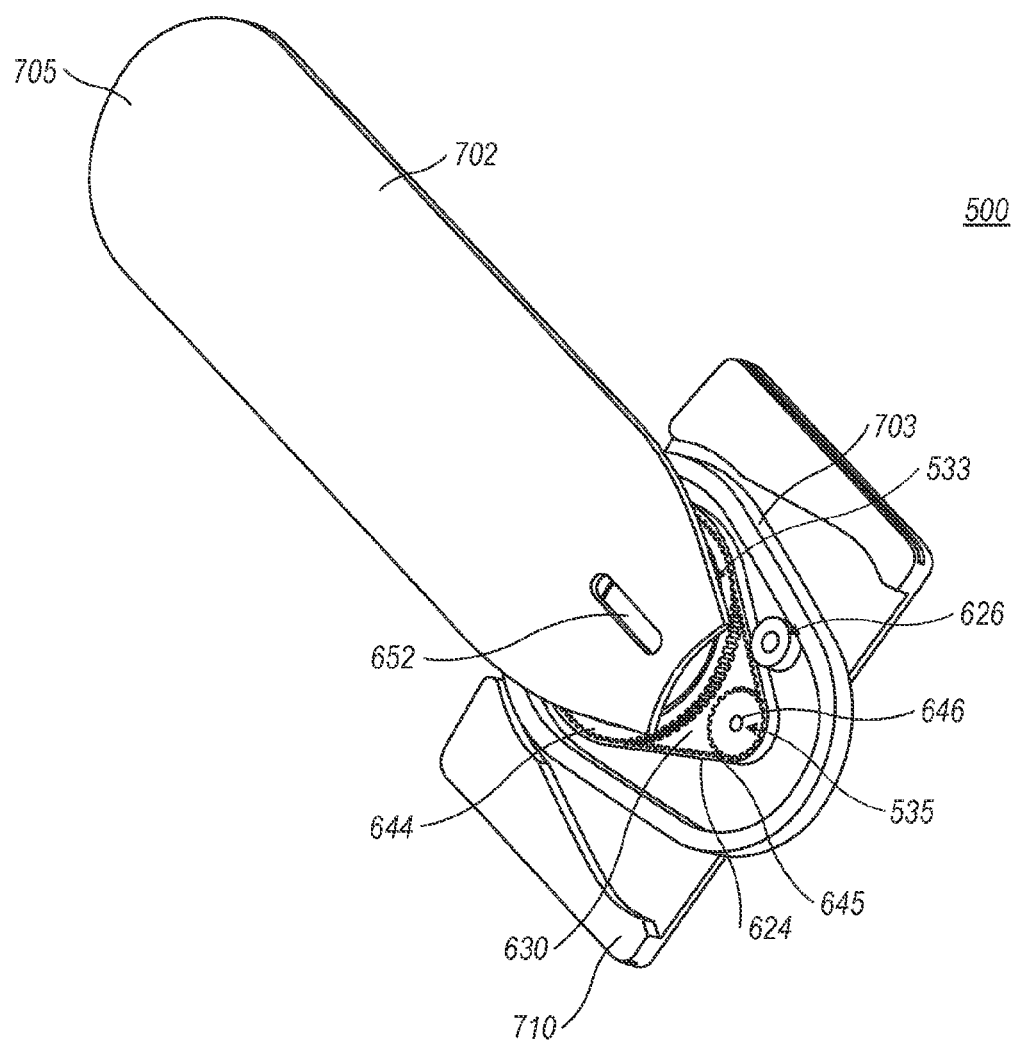
FIG. 8 is a front isometric, partial cutaway view of an exemplary chainsaw cutting assembly having two geared pulleys, a gear belt, and tension adjustment mechanism.
Figure 9:
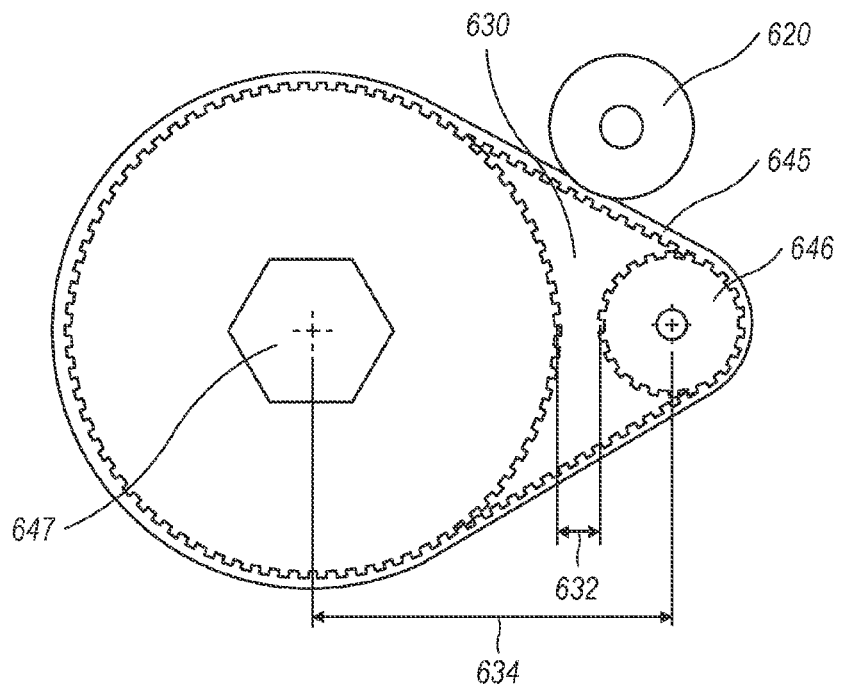
FIG. 9 is an elevational view of the two geared pulleys, gear belt and tension adjustment mechanism of FIG. 8.
Figure 10:
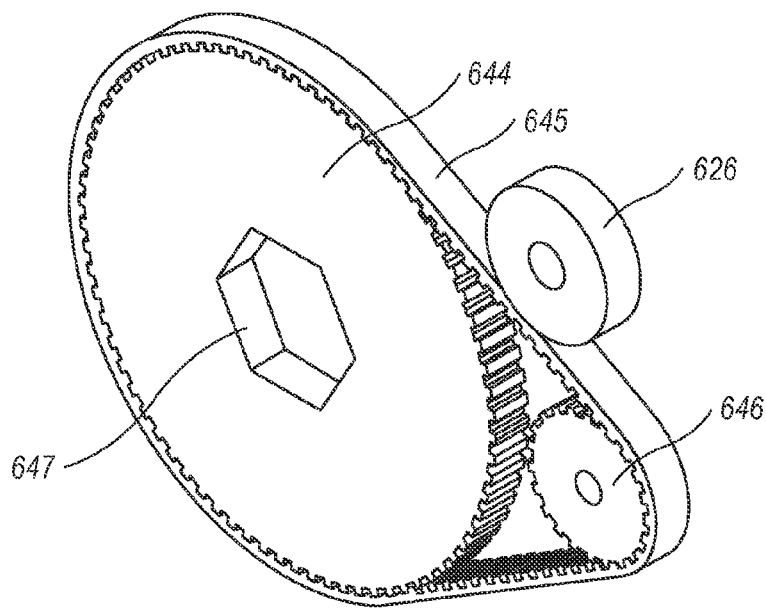
FIG. 10 is an isometric view of the two geared pulleys, gear belt and tension adjustment mechanism of FIG. 8.

In FIGS. 8-10, a looped mechanism 624 in the form of a timing-style, toothed or geared belt 645 is illustrated. The geared belt 645 serves similarly to the above described roller chain. FIG. 8 is an isometric and partial cutaway view of an exemplary chainsaw cutting assembly 500. As illustrated, the driven member 533 and cutting chain drive member 535 are gear pulleys. These gear pulleys can be configured as described above. Specifically, and as illustrated in FIG. 8, the driven member 533 is a driven gear pulley 644 and the cutting chain drive member 535 is a cutting chain drive gear pulley 646. The driven geared pulley 644 includes a series of teeth 537 about its circumference and the cutting chain drive member 535 includes a series of teeth 537 about its circumference. A geared drive belt 645 connects the driven gear pulley 644 and cutting chain drive gear pulley 646. Additionally, a tension adjustment mechanism 626 that is a round, disk-shaped wheel having a circumference abuttingly engaged upon an exterior peripheral surface of the geared drive belt 645 is illustrated. An elevational view of the driven gear pulley 644, cutting chain drive gear pulley 646, tension adjustment mechanism 626 and gear drive belt 645 is illustrated in FIG. 9. As illustrated, the driven gear pulley 644 features a hexagonal aperture 647. The hexagonal aperture 647 is configured to accept the blade drive shaft 372. A perspective view of the same arrangement is presented in FIG. 10.

Figure 11:
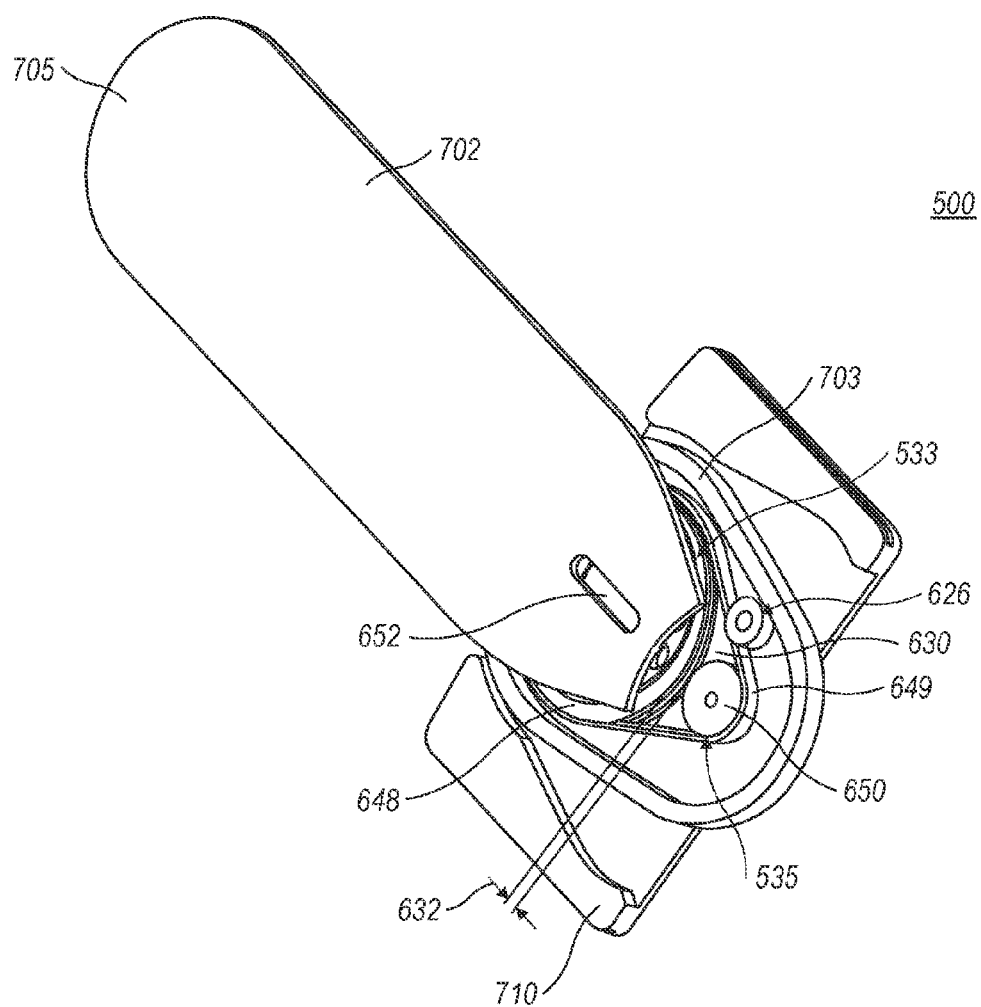
FIG. 11 is a front isometric, partial cutaway view of an exemplary chainsaw cutting assembly having two vee-belt pulleys, a vee-belt, and tension adjustment mechanism.
Figure 12:
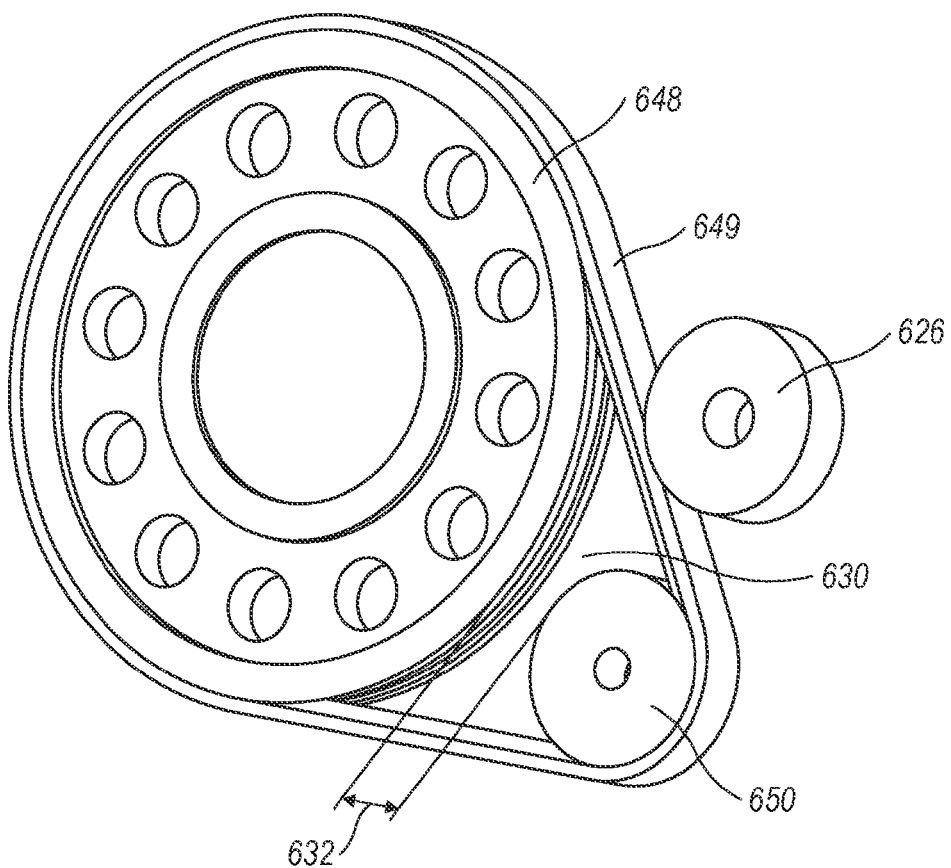
FIG. 12 is an isometric view of the two pulleys, vee-belt and tension adjustment mechanism of FIG. 11.

FIGS. 11-12 present a looped mechanism in the form of a vee-belt 649 having multiple insert ridges or vees. The vee-belt 649, as illustrated, has four vees. FIG. 11 is an isometric and partial cutaway view of another chainsaw cutting assembly 500. As shown, the driven member 533 is a driven vee-belt pulley 648 and the cutting chain drive member 535 is a cutting chain drive vee-belt pulley 650. These vee-belt pulleys can be configured as described above in relation to the driven member 533 and cutting chain drive member 535. Specifically, as illustrated, the driven vee-belt pulley 648 includes four vees. The cutting chain drive vee-pulley 650 also includes four vees. The vee-belt connects the driven vee-pulley 648 and the cutting chain drive vee-pulley 650. Additionally, a tension adjustment mechanism 626 that is a round, disk-shaped wheel having a circumference abuttingly engaged upon an exterior peripheral surface of the vee-belt 649 is illustrated.

Figure 13:
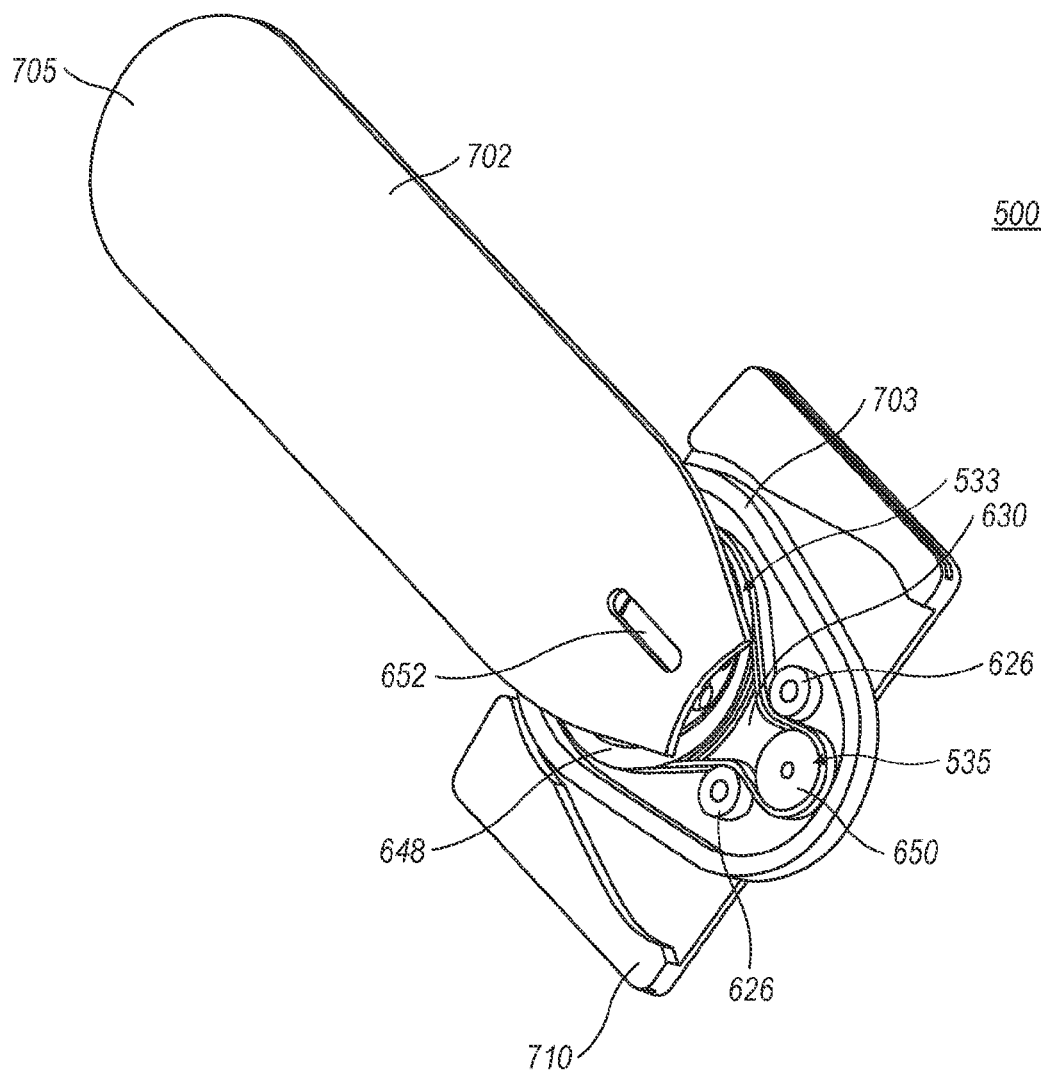
FIG. 13 is a front isometric, partial cutaway view of an exemplary chainsaw cutting assembly having two vee-belt pulleys, a vee-belt, and a tension adjustment assembly including two tension adjusting mechanisms.

In another embodiment illustrated in FIG. 13, two tension adjustment mechanisms 626 are implemented. The additional tension adjustment mechanism 626 allows for increased control over the vee-belt 649. When a single tension adjustment mechanism 626 is included it controls the engagement of the looped mechanism 624 (for example a chain or belt) when it engages with the cutting chain drive member 535 as described above. The inclusion of an additional tension adjustment mechanism 626 allows for enhanced control over the engagement of the looped member with the cutting chain drive member 535. Specifically, the inclusion of two tension adjustment mechanism 626 allows for greater control when the looped mechanism 624, for example the vee-belt 649, can be driven in a clockwise or counter-clockwise direction. As described above, the ability to change the direction of the looped mechanism 624 can allow for the ability to control the direction of cutting by the chainsaw cutting assembly 500.

Figure 14:
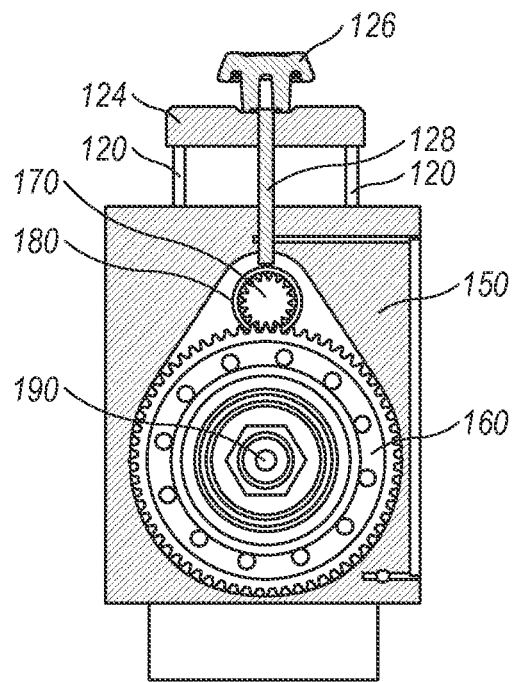
FIG. 14 illustrates a section view of the drive gears within a housing of the saw at line 14-14 of FIG. 3.
Figure 15:
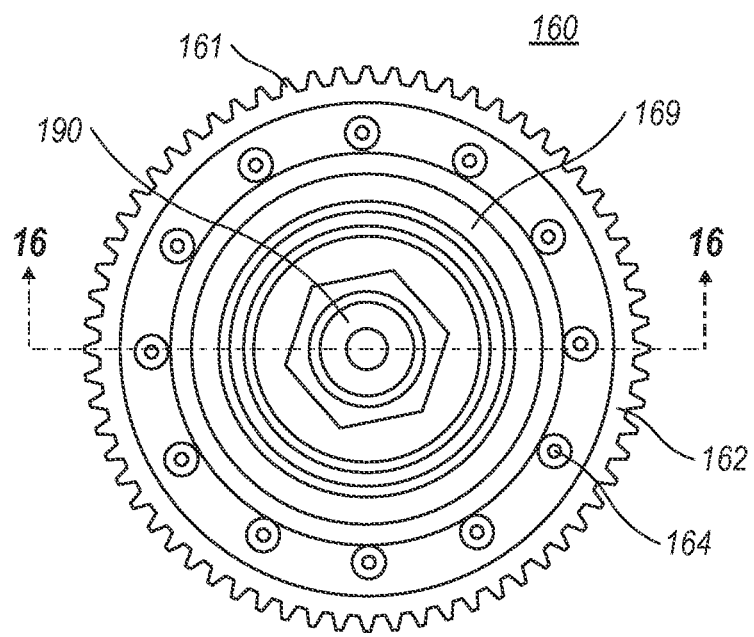
FIG. 15 illustrates a drive gear according to an exemplarily embodiment of the present disclosure.

A section view of the drive mechanism of FIG. 3 along section lines 14-14 is shown in FIG. 14. The drive mechanism includes a drive gear 160 and output gear 170. The output gear 170 rotates within a bearing 180. The drive gear is located within the chain bar mounting housing 150. A detailed view of the drive gear 160 is shown in FIG. 15. As shown the drive gear 160 includes a gear wheel 162 having gear teeth 161 and at least one fastening mechanism 164. As illustrated there are a plurality of fastening mechanism 164. An input connection 190 is coupled to the output shaft of the saw arm. While the drive gear 160 is illustrated with a gear wheel having teeth 161, as described above, the gear wheel can instead be configured to drive a belt or the like.

Figure 16:
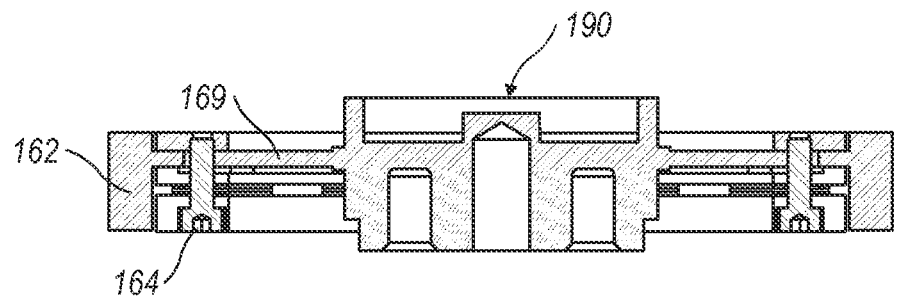
FIG. 16 is a cross-section of the drive gear of FIG. 14 at line 16-16.
Figure 17:
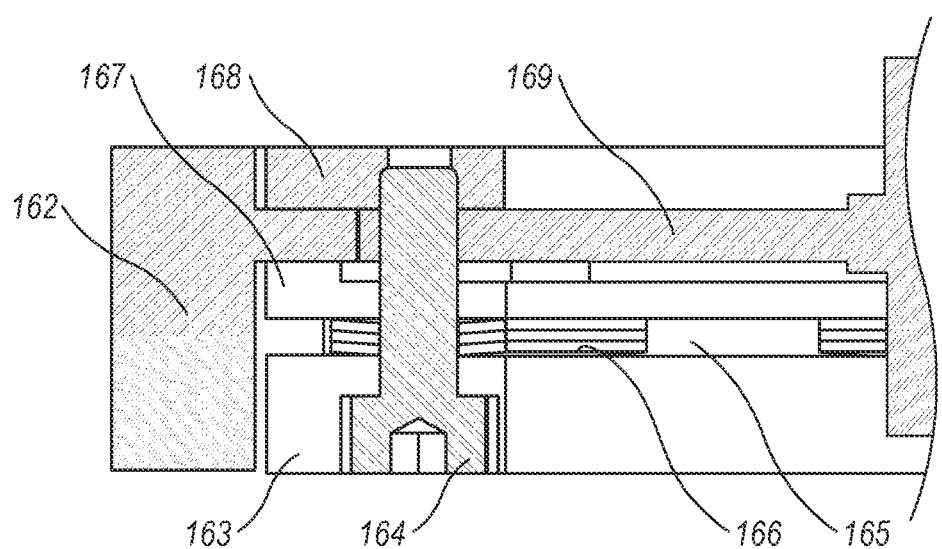
FIG. 17 is a detail view of portion of cross-section of the cross-section in FIG. 16.

A section view of the drive gear 160 along the line 16-16 of FIG. 15 is illustrated in FIG. 16. As illustrated the drive gear 160 includes a clutch mechanism. A detailed view of a portion of FIG. 16 is illustrated in FIG. 17. The clutch mechanism of FIG. 17 includes a gear wheel 162, a drive wheel 169, a clutch plate 167, at least one fastening mechanism 164, and a biasing wheel 165. The clutch mechanism allows the gear wheel 162 to slip in relation to the drive wheel 169. When the saw 100 is provided with the illustrated clutch mechanism, the saw is provided with a mechanism to prevent damage to the saw chain. The output shaft of the saw arm is capable of providing enough torque to the drive gear 160 and in turn the saw chain so as to cause damage to the saw chain. The clutch mechanism provides for slipping engagement of the gear wheel 162 relative to the drive wheel 169. In at least one embodiment, the slip engagement of the gear wheel 162 is based upon the desired torque at the output gear 170. In order to control the slip of the clutch mechanism, the present disclosure contemplates two adjustment mechanisms. The first is adjusting the torque of the at least one fastening mechanism 164. By adjusting the torque of the fastening mechanism 164, the amount of slip can be reduced or increased. For example, if the at least one fastening mechanism 164 is tightened the amount of torque that can be transferred to the gear wheel 164 from the drive wheel 169 is increased. Conversely, if the at least one fastening mechanism is loosened, the amount of torque transferred from the drive wheel 169 to the gear wheel 162 is decreased.

The amount of torque transferred from the drive wheel 169 to gear wheel 162 can also be adjusted by configuring the biasing wheel 165 and clutch plate 167. The biasing wheel 165 includes at least one biasing member 166. The biasing wheel 165 can have a plurality of biasing members 166. For example as illustrated, three biasing members 166 are provided. The number of biasing members 166 can be used to adjust the torque transferred from the drive wheel 169 to gear wheel 162. In at least one embodiment, each of the plurality of biasing members 166 is identical and capable of exerting the same amount of biasing force.

The gear wheel 162 is coupled to the drive wheel 169 by the at least one fastening member 164. For example, the at least one fastening member 164 is a bolt as illustrated. In other embodiments, the at least one fastening member 164 could be another type of fastening member for example a screw, rivet, pin and the like. When the at least one fastening member 164 additional fastening components can be included. For example, at least one fastening block 163 can be included. The at least one fastening block 164 can be a disc that contacts the biasing wheel on the side opposite the clutch plate 167. The at least one fastening block 164 can also be sized to engage with just a portion of the biasing wheel 165, for example portion having an exposed biasing member 166 can be contacted. The at least one fastening mechanism 164 passes through a through hole in the drive wheel 169. A distal end of the at least one fastening member 164 is coupled to fixing member 168. The at least one fixing member 168 is affixed to the drive wheel 169. The at least one fixing member 168 is threaded for threading engagement with the at least one fastening member 164. The at least one fixing member 168 is located on an opposite side of the drive wheel 169 and gear wheel 162 from the clutch plate 167, wherein the clutch plate 167 and the at least one fixing member 168 form a sandwich with the drive wheel 169 and gear wheel 162 located therebetween.

FIG. 18 illustrates a side view of the saw including safety cover 110. As illustrated the saw 100 includes a carriage 104. The carriage 104 includes rollers for rolling along the rack 102. Additionally, the carriage includes a rack gear engagement portion that engages with the gears on the rack 102. The rack gear engagement portion can be driven by the saw motor 106 or a separate motor. The cover engagement mechanism 400 secures the cover 110 to the saw 100. A retention member 401 includes an aligned set of contact surfaces configured to releasably fix the safety cover 110 to the saw 100. The safety cover affixment mechanism 402 couples the safety cover 110 to a safety cover anchor mechanism 108 extending from the saw 100. The safety affixment mechanism 402 rotatably couples the safety cover 110 to the safety cover anchor mechanism 108. The safety cover affixment mechanism 402 decouples from the safety cover anchor mechanism 108 when a predetermined force at the safety cover affixment mechanism 402 is exceeded. Additionally, a safety cover securement mechanism can be included to retain the safety cover 110 when the safety cover affixment mechanism 402 has decoupled. The safety cover securement mechanism includes a connection 109 that can slide within contact surfaces 107 (as illustrated in FIG. 1).

FIGS. 19-22 illustrate the control of the cutting depth of the chain bar and related motion of the carriage and saw arm. The illustrations show a couple of positions of the saw as it cuts a vertical cut in a floor. In other embodiments, the saw 100 can also be used to cut horizontally in a wall. As described herein, the saw is capable of doing a plunge cut against a vertical barrier while moving the cutting edge of the chain bar in a vertical direction.

Figure 19:
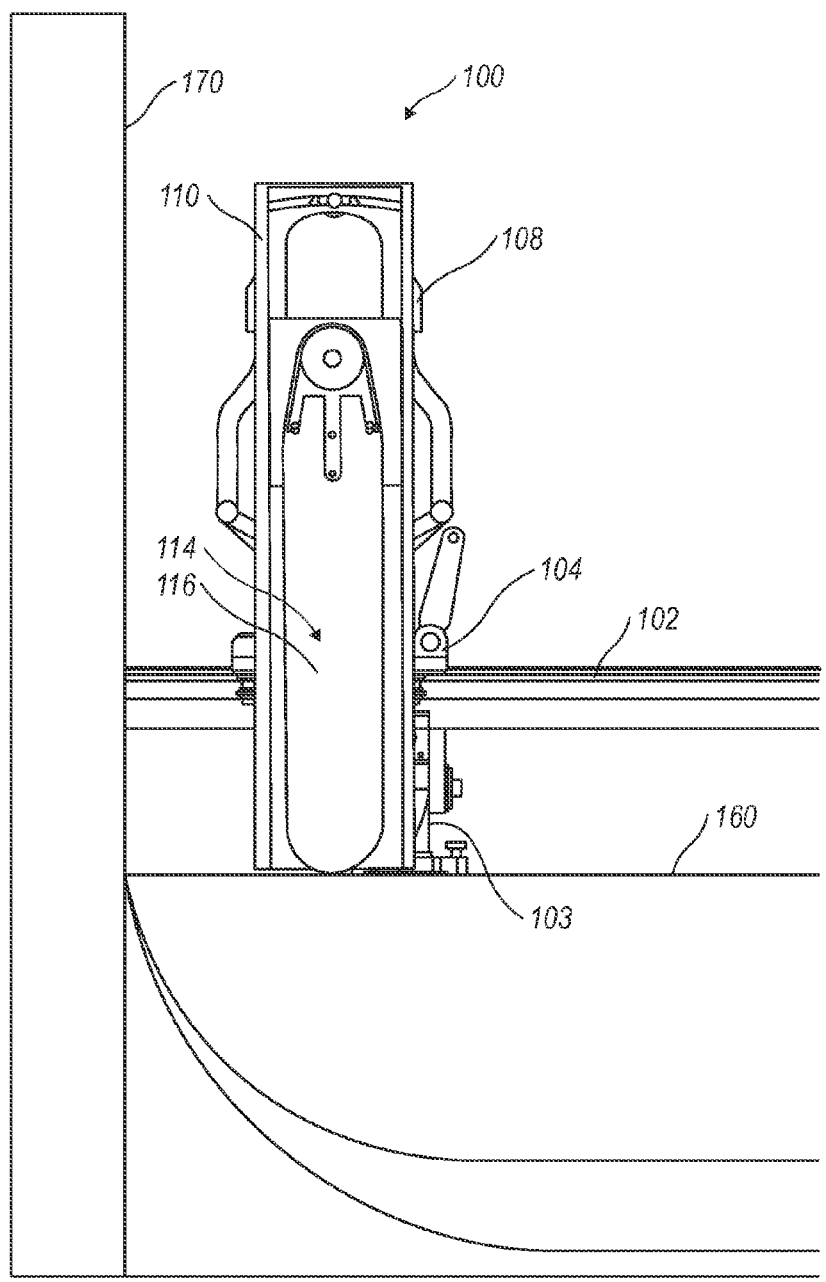
FIG. 19 is an elevation view of saw in a protected sword orientation according to an exemplarily embodiment of the present disclosure.

In FIG. 19, the saw 100 is in a protected sword orientation. The protected sword orientation can be achieved by having the operator indicate that a protected sword orientation is desired via controller 300. In one embodiment, the saw 100 returns the chain bar 116 and saw arm to a protected sword orientation. If the protected sword orientation is not substantially vertical or horizontal (in the case of a wall saw) the operator can make a correction request. When the correction mode is entered, the operator can align the chain bar 116 and saw arm (hidden). Once the operator has confirmed alignment, the saw 100 is in a start position in which the saw arm and chain bar are substantially parallel to one another. The operator then interacts with the controller to control the position of the saw 100 relative to the position that the cut should be made. The operator can instruct the saw 100 to move along the rack 102. Additionally, the operator can instruct a depth of cut to be made. The cut can be instructed to be made in one direction or along a curved path. In the illustrated embodiments, the cut is along a single direction (a vertical cut).

When the vertical cut command is received by the controller and the wall 170 is to the left of the saw, the operator can instruct a counterclockwise rotation 158 of the saw arm 112 so that the chain bar 116 moves downward according to arrow 152. As shown in FIG. 20, the saw arm 112 rotates in a counterclockwise direction 158, the carriage 104 moves the saw to the right according to arrow 154. The safety cover also rotates in a clockwise direction 156. The motion of the components is controlled so that the motion of the carriage 104 is substantially simultaneously with the saw arm 112. As mentioned above, in at least one embodiment, the saw arm 112 can be driven by a saw arm motor or the general saw motor 106 through a transmission. Furthermore, the carriage 104 can be driven by separate motor 426 or though a transmission connected to the saw motor 106. The amount of angular rotation and motion of the carriage are based upon the length of the saw arm 112 and chain bar 116.

Figure 21:
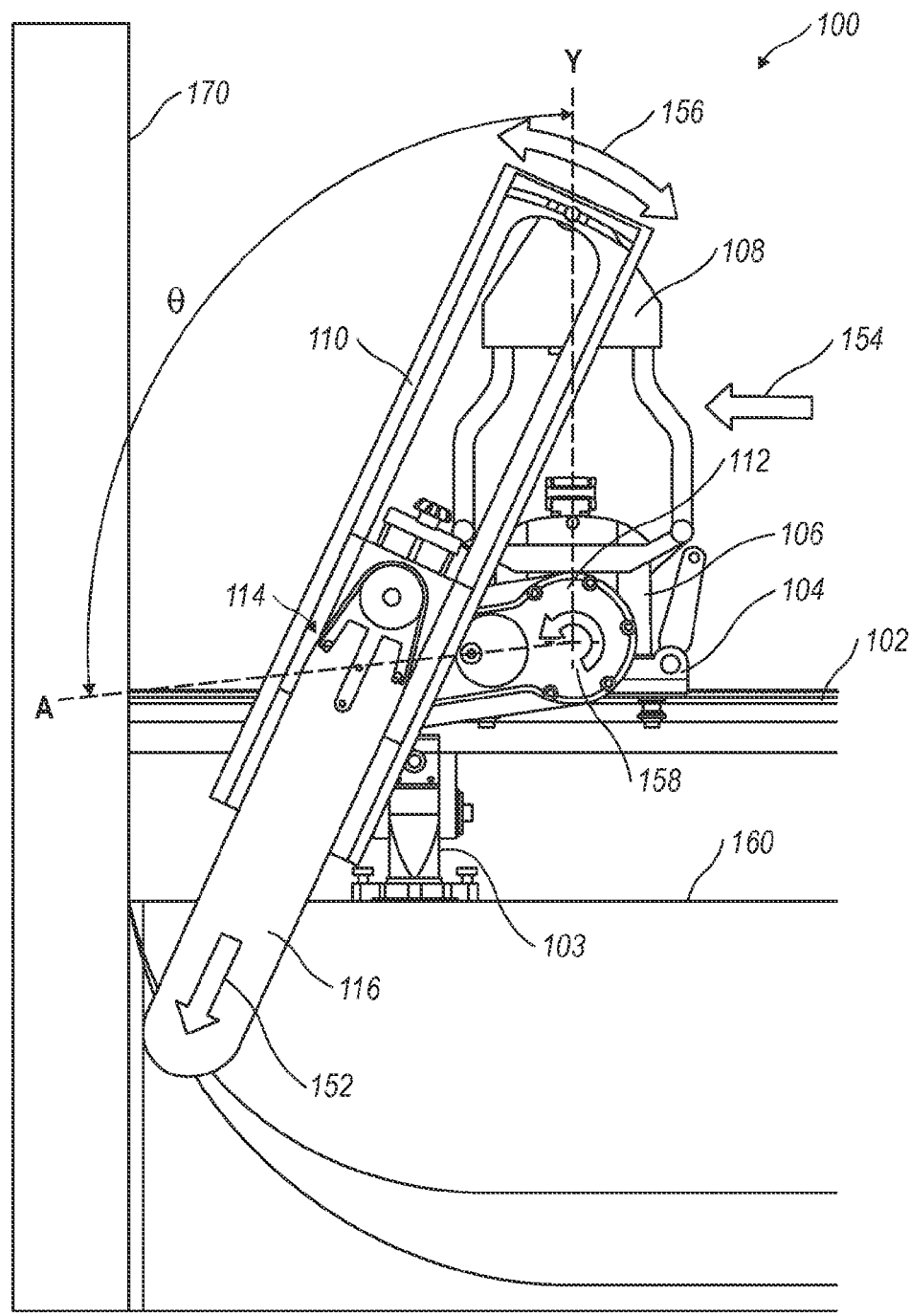
FIG. 21 is an elevation view of saw in a third orientation according to an exemplarily embodiment of the present disclosure.

FIG. 21 shows another view of the saw 100 as cutting continues in a vertical direction against the wall 170. FIG. 21 illustrates the change in direction of the carriage 104 as the angle of rotation of the saw arm passes ninety degrees from the start position. Until the saw arm 112 reaches the ninety degree position, the carriage 102 moves to the right as shown in relation to FIG. 20. Once the saw arm 112 reaches the ninety degree position the carriage 102 reverses direction and moves to the left as shown by arrow 155. The safety cover continues to rotate in a clockwise direction.

As shown in FIG. 22, the downward cutting can continue as described until the saw arm 112 reaches almost one hundred and eighty degrees from its start configuration.

Figure 23:
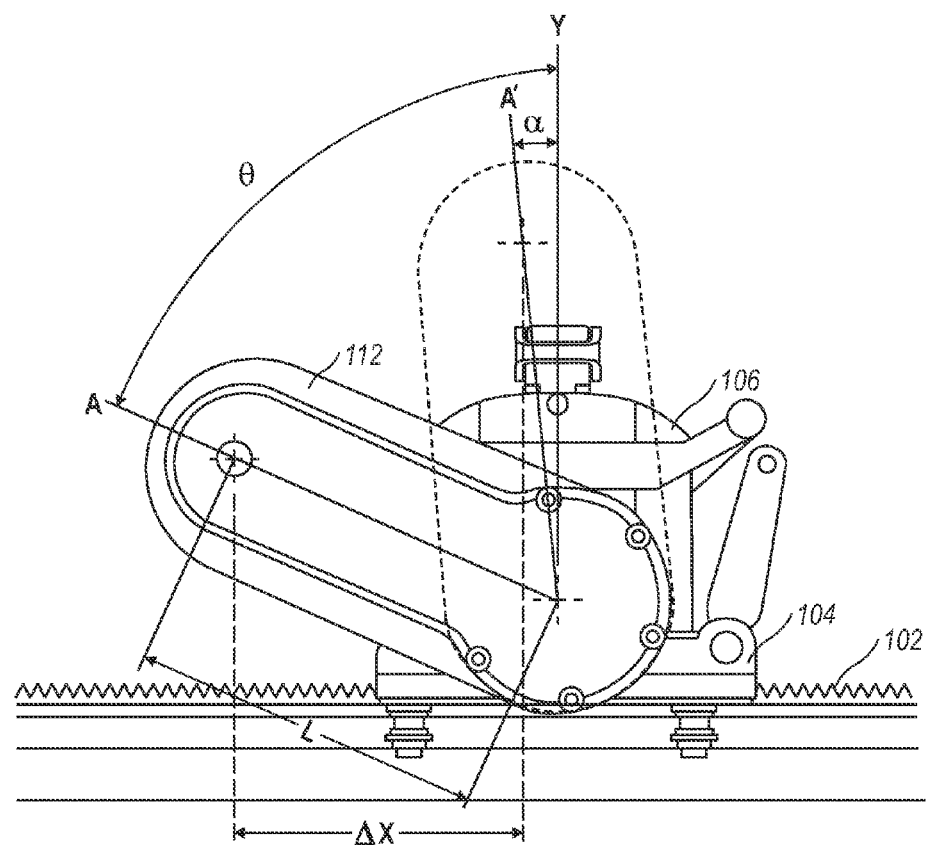
FIG. 23 is an exemplarily partial view of the saw and saw arm illustrating relative angles of two positions of the saw arm.

FIG. 23 illustrates a the saw 100 with a saw arm 112 on a rack 102. When the saw arm 112 is in the position with a longitudinal axis of line A, it forms an angle θ with respect to a vertical axis Y. The saw arm 112 has a length of L between a saw motor connection point and a chain saw connection point. When the saw arm 112 rotates to a second position shown in dashed lines wherein the longitudinal axis of line A', the saw arm 112 forms an angle α with respect to the vertical axis Y. In the illustrated embodiment, the carriage 104 is shown as being stationary. As described above, if the operator wants the chain bar to only cut the surface in a single direction the carriage can move as the saw arm 112 moves. In order to determine, the amount that the carriage should move with respect to a change in angle, the following calculation is performed and the carriage motion is adjusted according thereto. In order for the chain bar to maintain its position in the surface, the carriage must move a distance ΔX to the right, when the saw arm rotates from a degrees to θ degrees.

Figure 24:
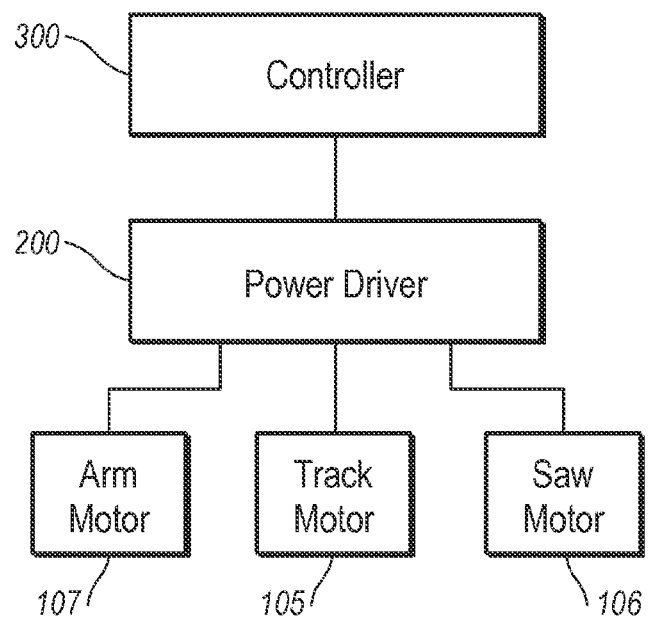
FIG. 24 is a block diagram of exemplarily components of one embodiment according to the present disclosure.

FIG. 24 illustrates a block diagram of the communication between components of the saw 100. A controller 300 is coupled to the power driver 200. The power driver is coupled to an arm motor 107, track motor 105, and saw motor 106. When the saw 100 includes an arm motor 107, the saw arm 112 is controlled via the arm motor 107. The arm motor 107 can include a positioning system whereby the rotation of the arm motor 107 includes a feedback mechanism to provide precise rotational control of the arm motor 107. The track motor 105 controls the motion of the carriage 102 as optionally described above. The track motor 105 can also be equipped with a feedback mechanism to provide control data to the controller 300 about the position of the rotation of the track motor 105.

Figure 25:
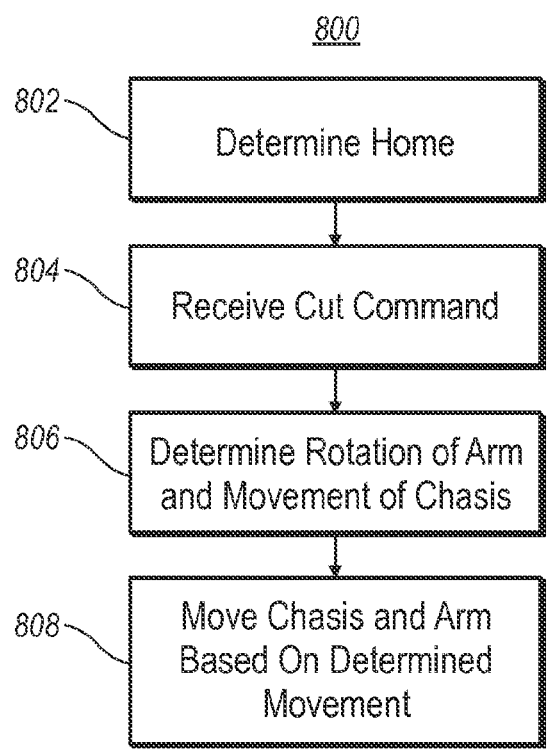
FIG. 25 is an exemplarily flow chart of a method according to the present disclosure.

FIG. 25 presents an exemplary method according to an embodiment of the present description. As described above, the saw 100 can be configured with a controller 300 to control the motion of the carriage 104 and saw arm 112. The method 800 includes a determination of a home position (block 802). The home position can also be described as a sword stored position wherein the sword or chain bar 116 of the saw 100 is stored in a safety cover 110. The home position as described above can be a position where the chain bar 116 and the saw arm are substantially parallel to one another. In another embodiment, the home position can be a position where the saw arm 112 is at a particular angle with respect to the carriage 104 and the chain bar 116. The operator can visually inspect the position of the saw arm 112 and the chain bar 116 and select an button to input that the saw is in the home position. The operator can then decide where to make the cut. The method then includes receiving a cut command (block 804). The cut command can be received in response to the operator interacting with the controller 300. Once the cut command is received the controller then instructs the saw arm 112 and carriage 104 in response to program to adjust the saw arm 112 and carriage 104 with respect to each other as described above. A determination of the rotation of the saw arm 112 and movement of the carriage 104 is made (block 806). Then the method then sends commands to the arm motor 107 and track motor 105 to adjust the saw arm 112 and carriage 104 respectively (block 808).

Those of skill in the art will appreciate that other implementations of the disclosure may be practiced in network computing environments with many types of computer system configurations, including personal computers, handheld devices, multi-processor systems, microprocessor-based or programmable consumer electronics, network PCs, minicomputers, mainframe computers, and the like. Implementations may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk, an optical disk, and non-transitory memory. Current examples of optical disks include compact disk-read only memory (CD-ROM), compact disk-read/write (CD-R/W), DVD, and Blu Ray™.

Implementations within the scope of the present disclosure may also include tangible and/or non-transitory computer-readable storage media for carrying or having computer-executable instructions or data structures stored thereon. Additionally, non-transitory memory also can store programs, device state, various user information, one or more operating systems, device configuration data, and other data that may need to be accessed persistently. Further, non-transitory computer-readable storage media expressly exclude media such as energy, carrier signals, electromagnetic waves, and signals per se. Such non-transitory computer-readable storage media can be any available media that can be accessed by a general purpose or special purpose computer, including the functional design of any special purpose processor as discussed above. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Both processors and program code for implementing each medium as an aspect of the technology can be centralized or distributed (or a combination thereof) as known to those skilled in the art.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, Wi-Fi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

In another embodiment illustrated in FIGS. 26A, 26B, and 27-30, a chain bar unit 2600 is illustrated. The chain bar unit 2600 can be implemented with the above described wall saw 100 and used in place of the chain saw assembly housing 150 described earlier. The function of the wall saw 100 can be the same or similar to that of the wall saw as described above, except that the chain bar unit 2600 is used for driving the chain or wire around the chain bar 1116. The tensioning mechanism described earlier could possibly be included. In at least one embodiment, the chain bar unit 2600 can be adapted for removable installation on the saw arm 112. As the chain bar unit 2600 can be removably installed on the saw arm 112, the chain bar unit 2600 can be easily removed for repair, for storage, and for transport. Furthermore, as the chain bar unit 2600 can be removably installed on the saw arm 112, the chain bar unit 2600 can be interchanged with various wall saw assemblies, and preferably with a circular saw blade, as described earlier.

Figure 26A:
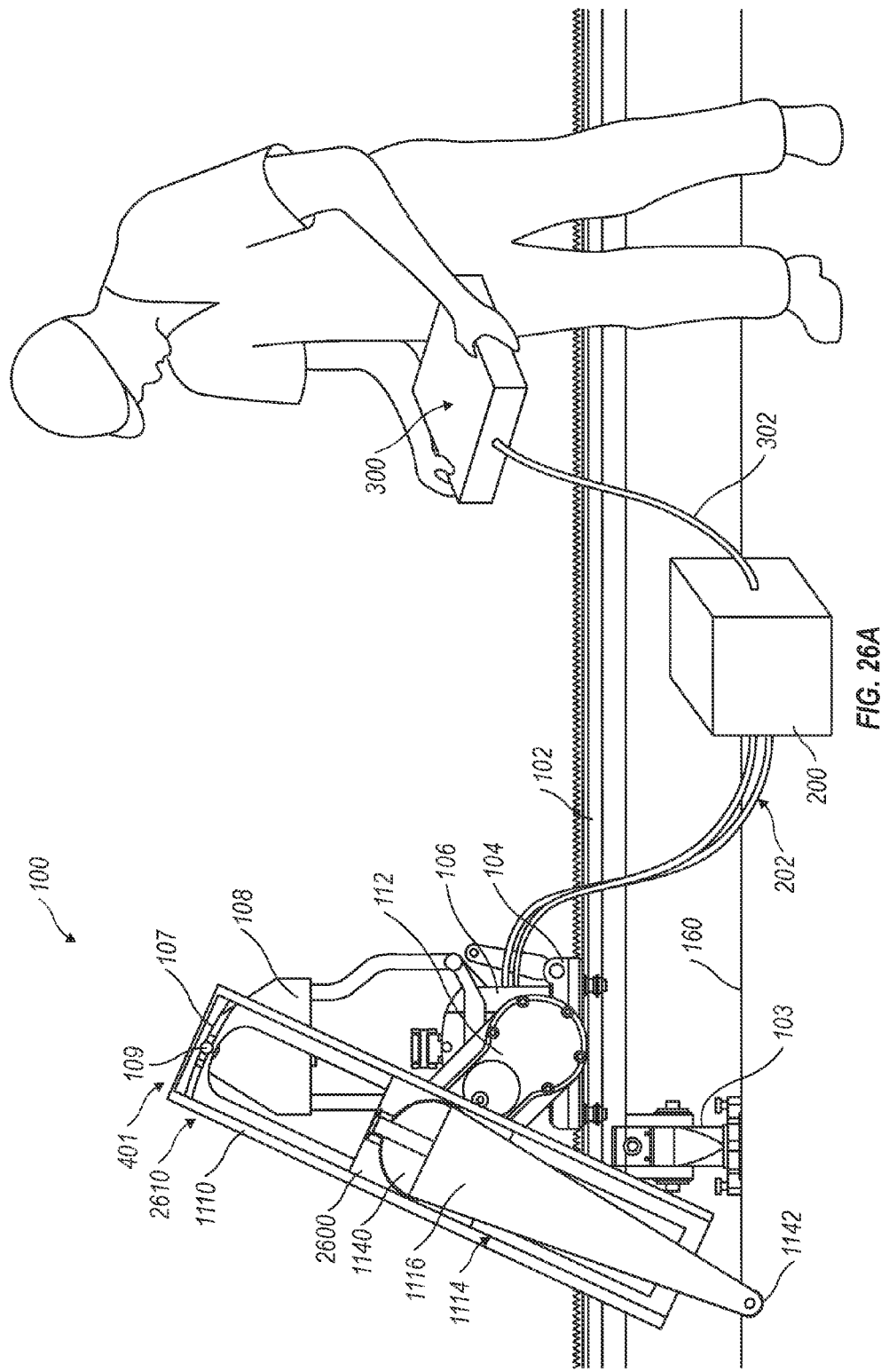
FIG. 26A illustrates a saw for cutting a wall or floor according to another exemplarily embodiment of the present disclosure.

For example, as illustrated in FIG. 26A, the wall saw 100 can include a safety cover and a safety cover anchor mechanism 108 which is coupled to the carriage 104. The safety cover anchor mechanism 108 allows the safety cover 1110 to be attached to the saw via a retention member 401. The safety cover 1110 can be adapted to accommodate the chain bar unit 2600. The retention member 401 allows the safety cover 1110 to rotate or turn with respect to the safety cover anchor mechanism 108. In the illustrated example, the saw motor 106 is coupled to a saw arm 112, which in turn is coupled to the chain bar 1116. The chain bar 1116 is adjustably mounted to a chain bar unit 2600, which is slidably connected to the safety cover 1110 via guides 1114. Therefore the safety cover 1110 and the connected chain bar unit 2600 together form a chain bar guiding system 2610 for the chain saw, providing numerous advantages compared to previous chain bar guiding systems. If for instance the saw arm 112 is turned slightly anti clockwise from the position shown in FIG. 26A the safety cover 1110 will turn slightly clockwise around the affixment mechanism 109 and the chain bar unit 2600 with saw bar 1116 will slide slightly downwards within the safety cover 1110. The retention member 401 is located at or near an outer end of the safety cover, i.e. away from the cut, while the guides 1114 are arranged to be able to guide the chain bar unit 2600 essentially all the way to an inner or cutting end of the safety cover 1110. This design enables the saw bar 1116 to be essentially fully withdrawn into the safety cover and be in a vertical position, or the saw bar to be in a further out or far out position, as described above and illustrated in relation to other embodiments in FIGS. 20 and 22, respectively. The safety cover 1110 is of course always perfectly in line with the saw bar, enabling the width of the cover to be only somewhat wider than the saw bar itself. Without this design a much wider, heavier and more costly safety cover would have been needed, very similar to a conventional wall saw safety cover. Further this design makes the chain bar unit 2600 to automatically be turned more than 90 degrees in relation to the outer end of the saw arm 112 during the cut.

Figure 26B:
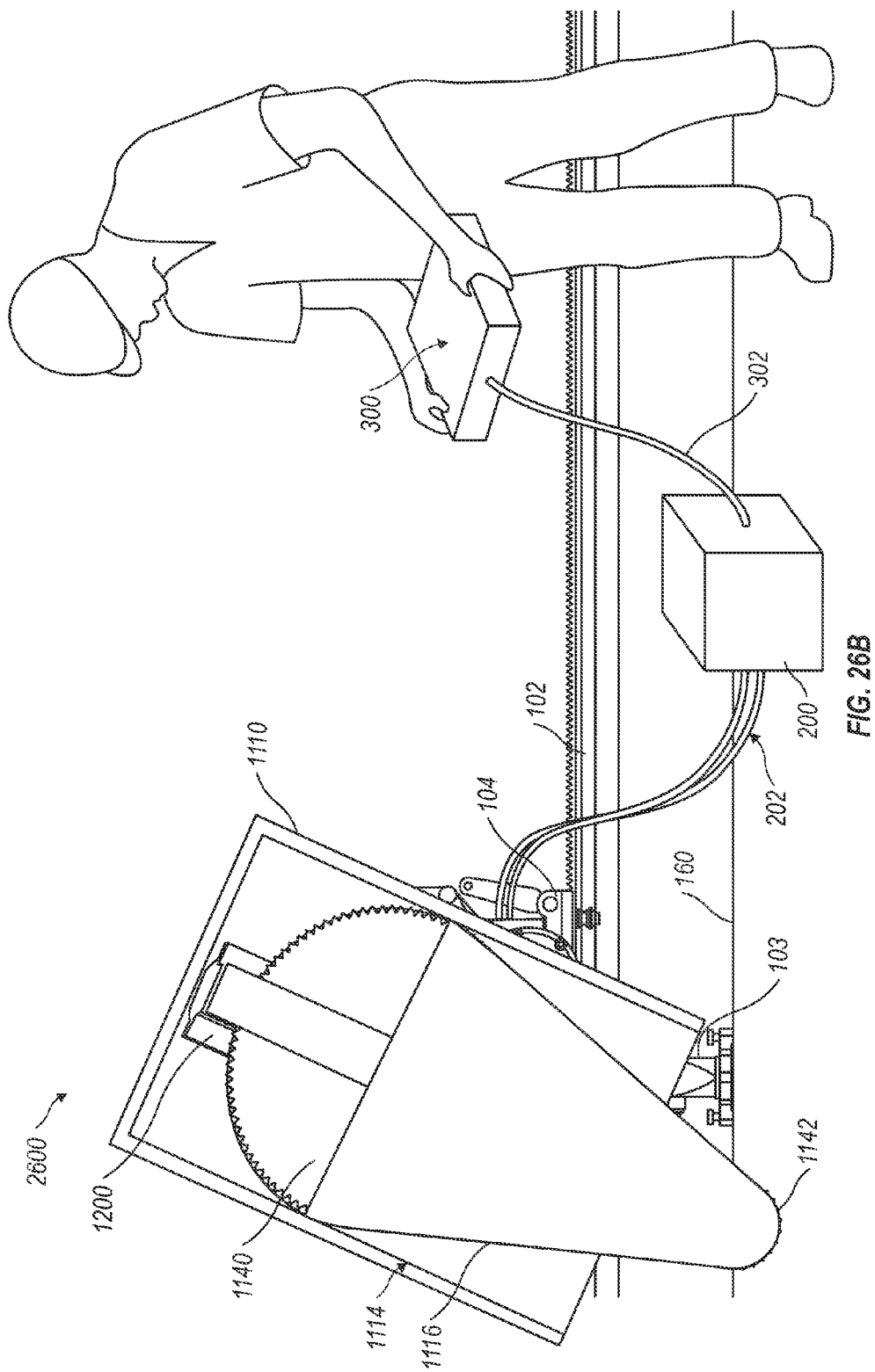
FIG. 26B illustrates a saw for cutting a wall or floor according to yet another exemplarily embodiment of the present disclosure.

As illustrated in FIGS. 26A and 26B, the chain bar unit 2600 can be coupled to a saw arm 112. For example, the chain bar unit 2600 can be rotatably coupled to the saw arm 112. The chain bar unit 2600 can be slidably connected to the safety cover 1110 to slide when the saw arm 112 is pivoted. Thus, when the saw arm 112 is in a starting position where the saw arm 112 is not pivoted, the safety cover 1110 can cover a majority of the chain bar unit 2600, thereby protecting the operator of the wall saw assembly 100 from injuring himself. Then, when the saw arm is pivoted, as shown in FIGS. 26A and 26B, the distal end 2605 of the bar 1116 of the chain bar unit can be at least partially exposed from the safety cover 1110 to engage a surface to be cut.

Other features of the safety cover 1110 can be similar to those as described above. The safety cover illustrated in FIG. 26A has been adapted to accommodate the chain bar unit 2600 which will be described in more detail below.

The chain bar unit 2600 includes a bar 1116 that can be configured to accept a circulating chain (not shown) around a perimeter of the bar 1116. The bar 1116 can also be configured to accept a wire, a cutting line, a cutting chain a chain belt, a chain band, or any other looped cutting member which can be received by the bar 1116 and which can circulate around the bar 1116 during cutting operations.

The chain bar unit 2600 can include a driving gear 1140 for driving the chain (or wire, cutting line, etc.) around the bar 1116. The driving gear 1140 can be configured to have the appropriate receiving surfaces for engagement with the chain, wire, cutting, line. The driving gear 1140 can be configured to be coupled to an output shaft 372, for example as shown FIG. 5 (as described above) of the wall saw 100. In other embodiments, the driving gear 1140 can be coupled to the output shaft in other configurations such as a mating engagement, a geared engagement, a press fit engagement, or a fastened connection. The output shaft 372 as described above can be configured for engagement with the driving gear 1140. In such an embodiment, the driving gear 1140 can receive the rotational output of the output shaft to circulate the chain around the perimeter of the bar 1116. In other words, the driving gear 1140 can impart a force on the chain to drive circulate the chain about the driven gear 1142 and the bar 1116.

FIG. 26B illustrates another example of the chain bar unit 2600. The chain bar unit 2600 can include the safety cover and retention mechanisms as described above, some of which are omitted for clarity. In other embodiments, the safety cover 1110 can be implemented with a differently configured safety cover 1110. The safety cover 1110 can for instance be integrally mounted with the chain bar unit 2600. The safety cover 1110 can be configured to substantially cover the chain bar 1116 when the chain bar 1116 is not within the material to be cut. As shown in FIG. 26B, the driving gear 1140 is substantially larger than the driving gear 1140 of FIG. 26A. Some further examples of the driving gear 1140 will be described below.

Figure 27:
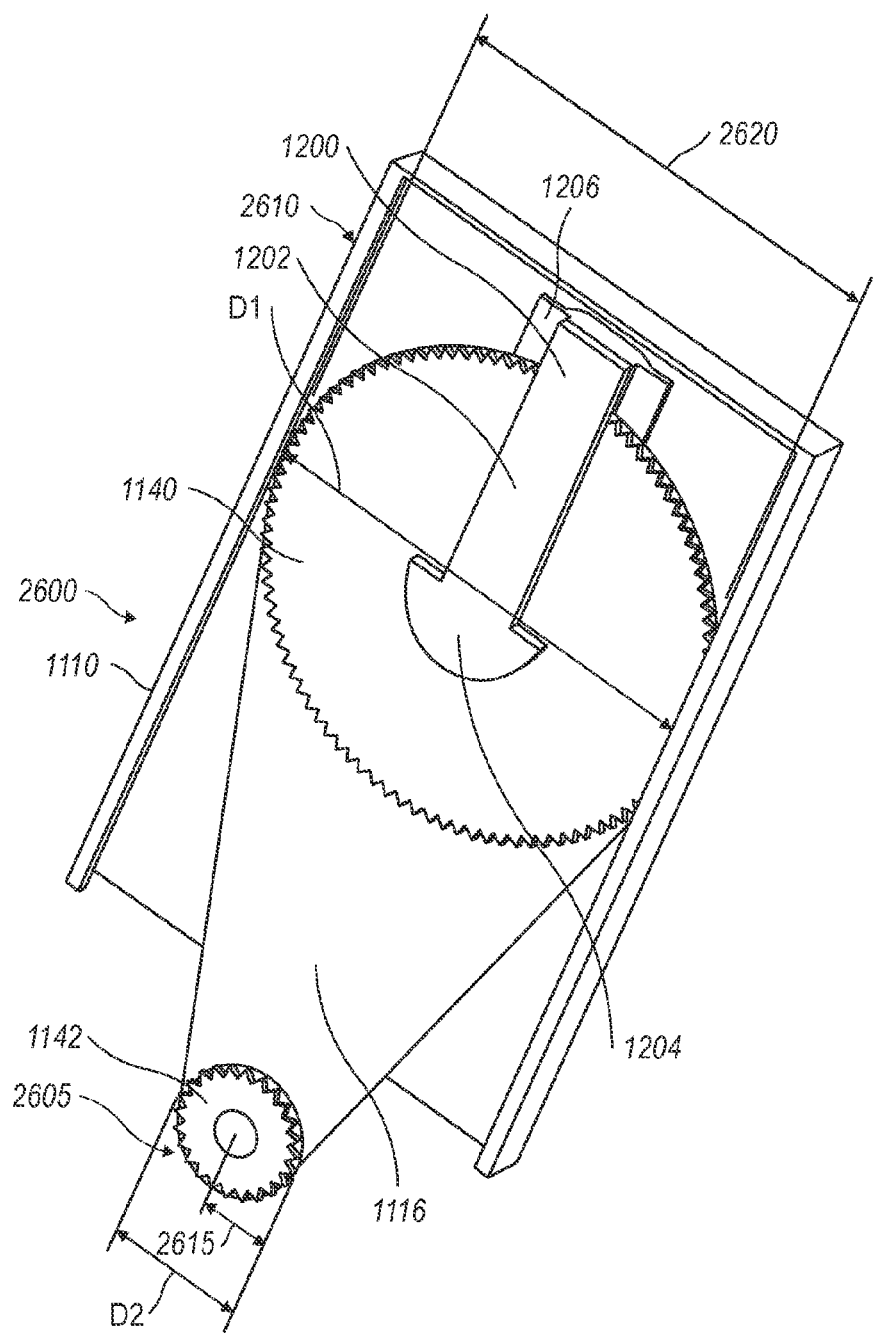
FIG. 27 is a perspective view of a chain bar unit according to an exemplarily embodiment of the present disclosure.

As illustrated in FIG. 27, the bar 1116 is illustrated without one of the sides of the bar. A further illustration of the construction of the bar 1116 will be given in relation to FIG. 31, below. The bar 1116 can be tapered. For example, the bar 1116 can be tapered from an end 2610 proximate to the driving gear 1140 to a distal end 2605. The distal end 2605 can have a distal end radius 2615 which can serve as a parameter for determining the size and placement of the bar 1116, drive gear 1140, or other element of the chain bar unit 2600. For example, a width 2620 of the bar 1116 at the proximate end 2610 can be at least two times the distal end radius 2615 of the distal end 2605. In at least one other embodiment, the width 2620 of the bar 1116 at the proximate end 2610 can be at least three times the distal end radius 2615 of the distal end 2605. In another embodiment, the width 2620 of the bar 1116 at the proximate end 2610 can be at least four times the distal end radius 2615 of the distal end 2605. In yet another embodiment, the width 2620 of the bar 1116 at the proximate end 2610 can be at least five times the distal end radius 2615 of the distal end 2605. In still another embodiment, the width 2620 of the bar 1116 at the proximate end 2610 can be at least six times the distal end radius 2615 of the distal end 2605. In yet another embodiment, the width 2620 of the bar 1116 at the proximate end 2610 can be at least eight times the distal end radius 2615 of the distal end 2605, or any other ratio where the width 2620 of the bar 1116 is larger than the distal end radius 2615 of the distal end 2605.

Also illustrated in FIG. 27, the chain bar unit 2600 can include a driven gear 1142. The driven gear 1142 can be located at the distal end 2605 of the bar 1116. The chain can circulate about the driven gear 1142 in response to a motive force imparted by the driving gear 1140. For example, the driving gear 1140 can be configured directly coupled to the output shaft of the wall saw 100. Therefore, the driving gear 1140 can receive a rotational output of the wall saw 100 and in response can impart a force on the driven gear 1142. For example, as the driving gear 1140 rotates, the driven gear 1142 will also rotate. In FIG. 26, the chain can couple the driving gear 1140 to the driven gear 1142, such that as the driving gear rotates 1140, the chain circulates around the driving gear 1140 and correspondingly pulls or imparts a motive force on the driven gear 1142 to rotate the driven gear 1142.

Additionally, in FIG. 27, the driving gear 1140 can have a diameter (D1) that is larger than the diameter (D2) of the driven gear 1142. As the diameter D1 of the driving gear 1140 is greater than the diameter (D2) of the driven gear 1114, and they are coupled to each other for example by a chain. Thus, the driving gear 1140 will rotate at a lower revolution per minute as compared to the corresponding speed of the driven gear 1142. The larger size of the driving gear 1140 will give an increased peripheral speed of the driven gear 1142 and the chain coupled to the bar 1116 to be moved at a desired speed. In FIG. 27, the diameter (D1) of the driving gear 1140 can be at least two times the diameter (D2) of the driven gear 1142. In at least one embodiment, the diameter (D1) of the driving gear 1140 can be at least three times and preferably at least four times the diameter (D2) of the driven gear 1142, or any other ratio that allows the diameter (D1) to be greater than the diameter (D2) of the driven gear 1142. For example, in FIG. 26, as the diameter (D1) of the driving gear 1140 is greater than the diameter (D2) of the driven gear 1142, the resulting speed of the chain around the distal end 2605 of the bar 1116 can be at least twenty meters per second. In another embodiment, the resulting speed of the chain around the distal end 2605 of the bar 1116 can be at least twenty-five meters per second. In yet another embodiment, the resulting speed of the chain around the distal end 2605 of the bar 1116 can be at least thirty-five meters per second, or any other speed.

Additionally, as illustrated in FIG. 27, the chain bar unit 2600 can include a chain bar coupling device 1200. The chain bar coupling device 1200 can be configured to retain a first and second side portions of the bar 1116 together.

Additionally, the chain bar coupling device 1200 can include a mounting mechanism for the driving gear 1140.

Figure 28:
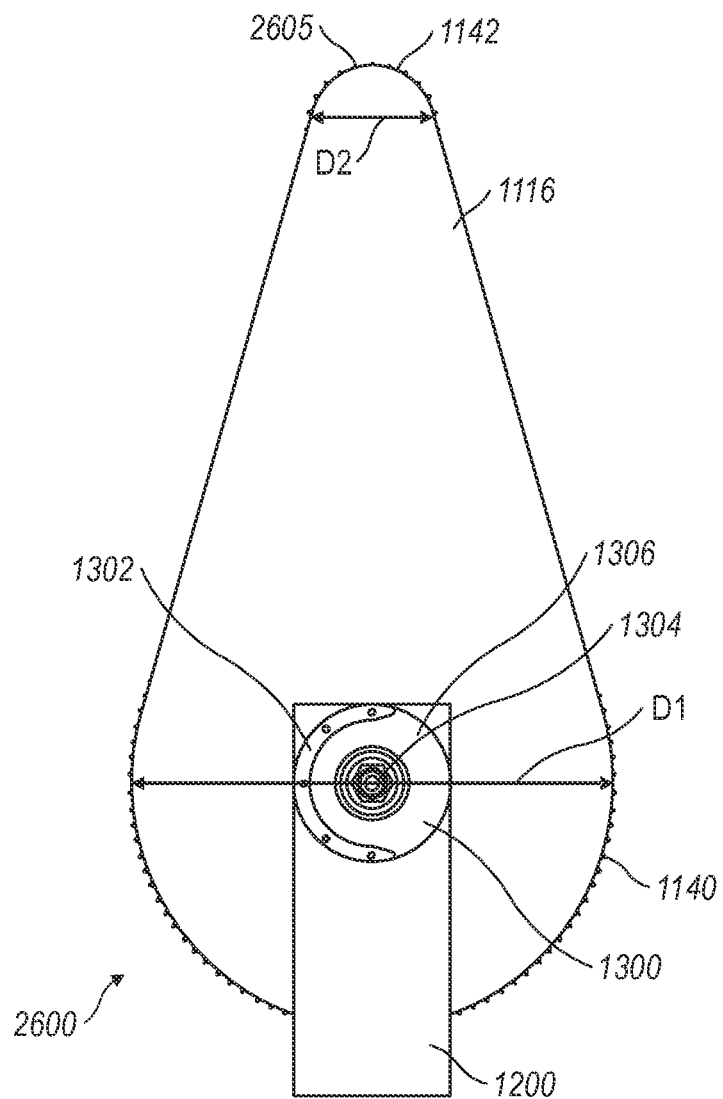
FIG. 28 is a rear view of the chain bar unit according to an exemplarily embodiment of the present disclosure.

FIG. 28 illustrates a rear view of the chain bar unit 2600. The rear side of the chain bar unit 2600 is configured for engagement with the saw arm 112. The chain bar unit 2600 can include a chain bar coupling device 1200 which includes a coupling mechanism 1300 on the rear face that abuts the saw arm 112. The coupling mechanism 1300 includes a face plate 1306 and a side engagement portion 1302. Furthermore, there is a coupling connection 1304 on the rear side of the driving gear 1140 for coupling the driving gear 1140 to the output shaft of the saw arm 112.

Figure 29:
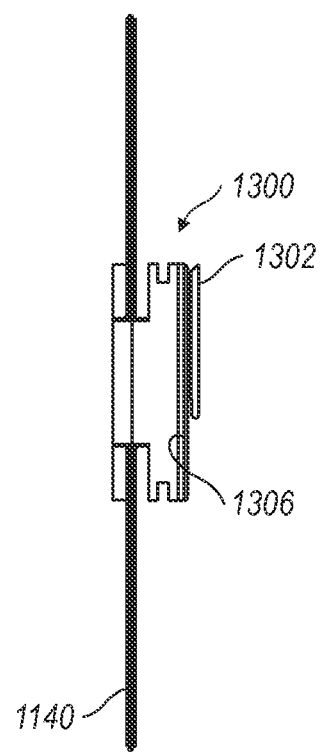
FIG. 29 is a side view of a coupling mechanism according to an exemplarily embodiment of the present disclosure.

FIG. 29 illustrates a side profile view of the coupling mechanism 1300 and the driving gear 1140. As described above, the coupling mechanism 1300 includes a face plate 1306 and a side engagement portion 1302.

Figure 30:
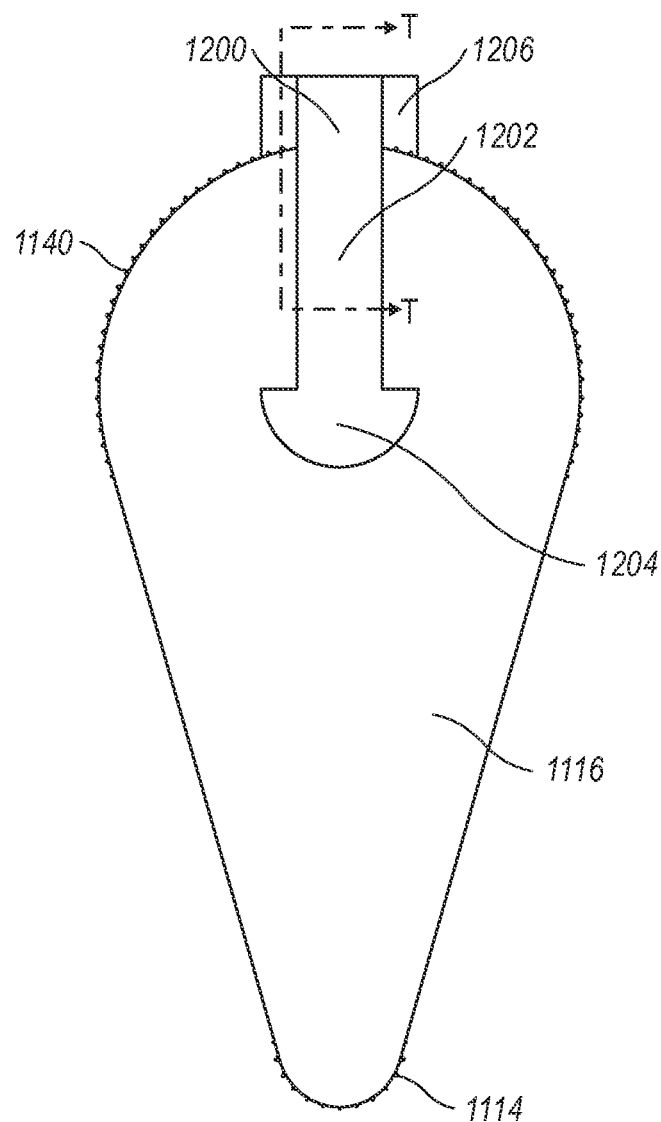
FIG. 30 is a front view of a chain bar unit according to an exemplarily embodiment of the present disclosure.
Figure 31:
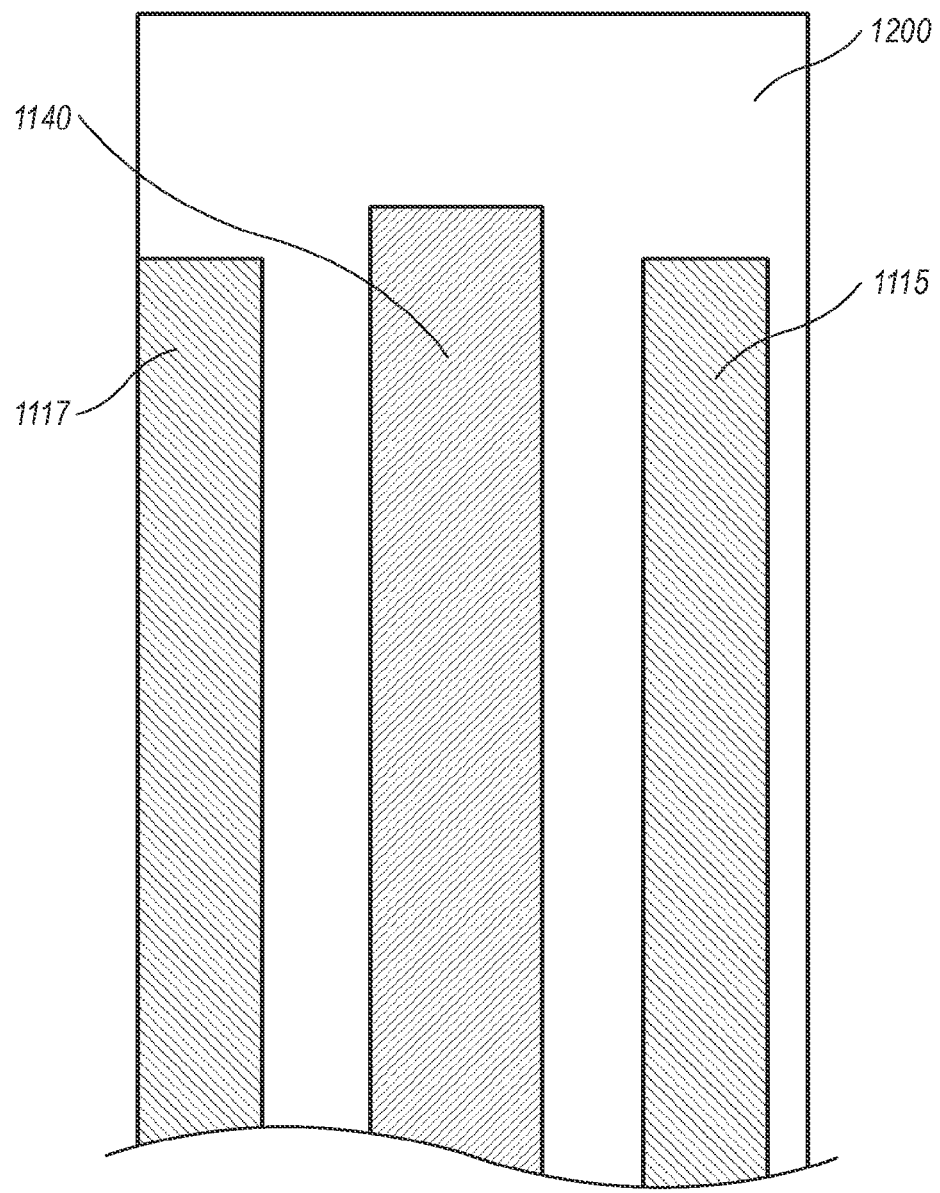
FIG. 31 is a section view of the chain bar unit according to FIG. 30 at section line T-T.

FIGS. 30 and 31 illustrate the chain bar coupling device 1200. As shown, coupling device can be coupled or integrally formed on chain bar 1116. The chain bar coupling device 1200 can be configured to couple the first side portion 1117 to the second side portion 1115. The chain bar coupling device 1200 can comprise and elongate portion 1202. The elongate portion 1202 can be configured to engage with a chain bar coupling device receiving portion of the second side portion 1115 so that the rotation of the second side portion 1115 resists rotation relative to the first side portion 1117. The chain bar coupling device 1200 can further include an end portion 1204. The end portion 1204 can have a semi-circular shape to further resist motion of the second side portion 115 relative to the first side portion 1117.

As illustrated in FIGS. 30-31, a majority of the driving gear 1140 can be located between the first side portion 1117 of the bar 1116 and the second side portion 1115 of the bar 1116. In another embodiment, the driving gear 1140 can be at least partially located between the first side portion 1117 and the second side portion 1115 of the bar 1116. In yet another embodiment, at least a portion of the driving gear 1140 can be located between the first side portion 1117 of the bar 1116 and the second side portion 1115 of the bar 1116.

Those of ordinary skill in the art will appreciate that the components of the wall saw assembly described in relation to FIGS. 1-25 can be optionally included in the wall saw assembly described in FIGS. 26-31.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A chain bar unit for a wall saw, comprising
   a bar configured to receive a circulating chain or wire around a perimeter of the bar;
   a driving gear for driving the chain or wire around the bar, the driving gear configured to be coupled to an output shaft of the wall saw; and
   a safety cover operably coupled to the bar to partially expose the bar responsive to pivoting of a saw arm of the wall saw;
   the bar being tapered from an end proximate to the driving gear to a distal end having a distal end radius, wherein a width of the bar at the proximate end, is at least two times the distal end radius of the distal end.

2. The chain bar unit as recited in claim 1, further comprising a driven gear located at the distal end of the bar, wherein the chain or wire circulates about the driven gear in response to a force imparted by the driving gear.

3. The chain bar unit as recited in claim 2, wherein the driving gear has a diameter that is at least two times the diameter of the driven gear.

4. The chain bar unit as recited in claim 2, wherein the driving gear has a diameter that is at least three times and preferably at least four times the diameter of the driven gear.

5. The chain bar unit as recited in claim 1, wherein the speed of the chain or wire around the distal end of the bar is at least twenty meters per second.

6. The chain bar unit as recited in claim 1, wherein the speed of the chain or wire around the distal end of the bar is at least twenty-five meters per second.

7. The chain bar unit as recited in claim 1, wherein the speed of the chain or wire around the distal end of the bar is at least thirty-five meters per second.

8. The chain bar unit as recited in claim 1, wherein the driving gear is directly coupled to the output shaft of the wall saw.

9. The chain bar unit as recited in claim 1, wherein the width of the bar at the proximate end is at least three times the distal end radius of the distal end.

10. The chain bar unit as recited in claim 1, wherein the width of the bar at the proximate end is at least four times the distal end radius of the distal end.

11. The chain bar unit as recited in claim 1, wherein the width of the bar at the proximate end is at least five times the distal end radius of the distal end.

12. The chain bar unit as recited in claim 1, wherein the width of the bar at the proximate end is at least six times the distal end radius of the distal end.

13. The chain bar unit as recited in claim 1, wherein the width of the bar at the proximate end is at least eight times the distal end radius of the distal end.

14. The chain bar unit as recited in claim 1, wherein the bar includes a first side portion and a second side portion.

15. The chain bar unit as recited in claim 14, wherein a portion of the driving gear is located between the first side portion of the bar and the second side portion of the bar.

16. The chain bar unit as recited in claim 14, wherein the majority of the driving gear is located between the first side portion of the bar and the second side portion of the bar.

17. A chain bar unit for a wall saw, comprising:
   a bar configured to receive a circulating chain or wire around a perimeter of the bar;
   a driving gear for driving the chain or wire around the bar, the driving gear configured to be coupled to an output shaft of the wall saw;
   the bar being tapered from an end proximate to the driving gear to a distal end having a distal end radius, wherein a width of the bar at the proximate end, is at least two times the distal end radius of the distal end,
   wherein the bar includes a first side portion and a second side portion, the chain bar unit further comprising a chain bar coupling device configured to couple the first side portion to the second side portion.

18. The chain bar unit as recited in claim 17, wherein the chain bar coupling device comprises an elongate portion configured to engage with a chain bar coupling device receiving portion of the second side portion so that the rotation of the second side portion resists rotation relative to the first side portion.

* * * * *